United States Patent
Rohani et al.

(10) Patent No.: US 10,796,204 B2
(45) Date of Patent: Oct. 6, 2020

(54) PLANNING SYSTEM AND METHOD FOR CONTROLLING OPERATION OF AN AUTONOMOUS VEHICLE TO NAVIGATE A PLANNED PATH

(71) Applicants: Mohsen Rohani, Gatineau (CA); Jun Luo, Toronto (CA); Song Zhang, Ottawa (CA)

(72) Inventors: Mohsen Rohani, Gatineau (CA); Jun Luo, Toronto (CA); Song Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 15/905,705

(22) Filed: Feb. 26, 2018

(65) Prior Publication Data
US 2018/0247160 A1    Aug. 30, 2018

Related U.S. Application Data

(60) Provisional application No. 62/464,196, filed on Feb. 27, 2017.

(51) Int. Cl.
*G06K 9/00* (2006.01)
*G06K 9/62* (2006.01)
(Continued)

(52) U.S. Cl.
CPC ............ *G06K 9/6262* (2013.01); *B25J 9/161* (2013.01); *B25J 9/162* (2013.01); *B25J 9/163* (2013.01); *B25J 9/1661* (2013.01); *B25J 9/1664* (2013.01); *B25J 9/1697* (2013.01); *B60W 10/18* (2013.01); *B60W 10/20* (2013.01); *B60W 30/10* (2013.01); *G05D 1/0088* (2013.01); *G05D 1/027* (2013.01);
(Continued)

(58) Field of Classification Search
CPC ........................... G05D 1/0257; G05B 13/027
See application file for complete search history.

(56) References Cited

U.S. PATENT DOCUMENTS

| 2006/0271269 A1 | 11/2006 | Stolle et al. |
| 2010/0228447 A1 | 9/2010 | Serban et al. |

(Continued)

FOREIGN PATENT DOCUMENTS

| CN | 101758827 A | 6/2010 |
| CN | 101976079 A | 2/2011 |

(Continued)

OTHER PUBLICATIONS

Dan Barnes et al., "Find Your Own Way: Weakly-Supervised Segmentation of Path Proposals for Urban Autonomy", arXiv:1610.01238v1 [cs.RO] Oct. 5, 2016.
(Continued)

*Primary Examiner* — Oneal R Mistry

(57) ABSTRACT

A multi layer learning based control system and method for an autonomous vehicle or mobile robot. A mission planning layer, behavior planning layer and motion planning layer each having one or more neural neworks are used to develop an optimal route for the autonomous vehicle or mobile robot, provide a series of functional tasks associated with at least one or more of the neural networks to follow the planned optimal route and develop commands to implement the functional tasks.

19 Claims, 10 Drawing Sheets

(51) Int. Cl.

| | |
|---|---|
| *G06N 3/00* | (2006.01) |
| *B25J 9/16* | (2006.01) |
| *B60W 10/18* | (2012.01) |
| *B60W 10/20* | (2006.01) |
| *B60W 30/10* | (2006.01) |
| *G05D 1/00* | (2006.01) |
| *G05D 1/02* | (2020.01) |
| *G06N 3/04* | (2006.01) |
| *G06N 3/08* | (2006.01) |
| *G06N 5/00* | (2006.01) |
| *G06N 5/04* | (2006.01) |

(52) U.S. Cl.
CPC ......... *G05D 1/0221* (2013.01); *G05D 1/0246* (2013.01); *G05D 1/0257* (2013.01); *G06K 9/00201* (2013.01); *G06K 9/00671* (2013.01); *G06K 9/00791* (2013.01); *G06K 9/627* (2013.01); *G06N 3/008* (2013.01); *G06N 3/04* (2013.01); *G06N 3/0445* (2013.01); *G06N 3/0454* (2013.01); *G06N 3/08* (2013.01); *B60W 2710/18* (2013.01); *B60W 2710/20* (2013.01); *G05D 2201/0213* (2013.01); *G06K 9/00664* (2013.01); *G06N 5/003* (2013.01); *G06N 5/046* (2013.01); *Y10S 901/01* (2013.01); *Y10S 901/47* (2013.01)

(56) References Cited

U.S. PATENT DOCUMENTS

| | | | |
|---|---|---|---|
| 2014/0324747 A1 | 10/2014 | Crowder et al. | |
| 2016/0306351 A1 | 10/2016 | Fisher et al. | |
| 2017/0259801 A1* | 9/2017 | Abou-Nasr | B60W 10/18 |
| 2017/0270374 A1* | 9/2017 | Myers | G06K 9/00369 |
| 2018/0075309 A1* | 3/2018 | Sathyanarayana | H04N 5/247 |
| 2018/0158197 A1* | 6/2018 | Dasgupta | G05D 1/0094 |
| 2018/0211121 A1* | 7/2018 | Moosaei | G06K 9/00825 |

FOREIGN PATENT DOCUMENTS

| | | |
|---|---|---|
| CN | 102609765 A | 7/2012 |
| CN | 104571113 A | 4/2015 |
| WO | 2005052883 A1 | 6/2005 |

OTHER PUBLICATIONS

Beomjoon Kim et al., "Socially Adaptive Path Planning in Human Environments Using Inverse Reinforcement Learning", International Journal of Social Robotics, Jan. 2016, vol. 8, Issue 1, pp. 51-66.

Shai Shalev-Shwartz et al., "Safe, Multi-Agent, Reinforcement Learning for Autonomous Driving", arXiv:1610.03295v1 [cs.AI] Oct. 11, 2016.

* cited by examiner

PLANNING SYSTEM AND METHOD FOR CONTROLLING OPERATION OF AN AUTONOMOUS VEHICLE TO NAVIGATE A PLANNED PATH

CROSS-REFERENCE TO RELATED APPLICATION(S)

The present disclosure claims the benefit of priority to U.S. Provisional Patent Application No. 62/464,196, filed Feb. 27, 2017, entitled "Systems and Method for Multi-Layer Learning Based Planning Computing for Mobile Robots and/or Autonomous Vehicles" which is hereby incorporated by reference in its entirety into the Detailed Description of Example Embodiments herein below.

TECHNICAL FIELD

At least some example embodiments relate to a multi layer planning architecture for mobile robots and autonomous vehicles and improvement of such planning architecture through machine learning.

BACKGROUND

Some planning architectures use various systems and methods to plan routes for autonomous vehicle or mobile robots and to navigate and control autonomous vehicles or mobile robots.

Planning architectures may be based on classical rule based methods whereby information about the environment, state of the autonomous vehicle or mobile robot is used in a rule based manner to decide the next action of the vehicle or robot. Planning architectures may also be based on finite state machines (FSMs), or search algorithms similar to rule based systems and methods.

Due to the dynamic and complex nature of either a driving environment or the environment in which a mobile robot may be located, it may be difficult to formulate every potential situation and to develop rules or FSMs for every possible situation. This would also require a large number of FSMs which may be difficult to develop, test, and verify.

Also, developing rules or FSMs for every possible situation may be computationally intensive. This requires developing a large number of rules or FSM's to account for each scenario that the mobile robot or the autonomous vehicle may experience. In cases where there is no rule for a given situation encountered by an autonomous vehicle or mobile robot, operation of the autonomous vehicle or robot may be hindered.

Additional difficulties with existing systems may be appreciated in view of the Detailed Description of Example Embodiments, below.

SUMMARY

The present discourse provide a planning system that may be used in mobile robots or autonomous self-driving vehicles, among other potential applications.

In accordance with one aspect of the present disclosure, there is provided a control system for a vehicle or mobile robot. The control system includes: memory storing computer-readable instructions for a plurality of feed-associated functional layers, each of the plurality of feed-associated functional layers comprising one or more neural networks, each of the one or more neural networks associated with at least one functional task for controlling at least one operable element of the vehicle or the mobile robot. The control system also includes at least one processor in communication with the memory and configured to execute computer instructions of each of the plurality of feed-associated functional layers stored in the memory to cause the at least one processor to provide input data to each one of the one or more neural networks of each functional layer, and execute each of the one or more neural networks, for each feed-associated functional layer, to generate output data based on the input data for controlling operation of the at least one operable element associated with the functional task associated with each of the one or more neural networks. The input data comprises sensor data sensed by a plurality of sensors of the vehicle or mobile robot and output data of at least one neural network of one of the plurality of feed-associated functional layers In some embodiments, at least one of the output data for at least one neural network is feed-associated as the input data to another neural network of any one of the functional layers.

In some embodiments, at least one of the input data for at least one neural network is feed-associated from one or more of the output data from another neural network of any one of the functional layers.

In some embodiments, said feed-associated comprises at least one of feed-forward or feedback.

In some embodiments, each neural network of the at least one functional layer has one or more input data or one or more output data that is feed-associated with only the neural network of a hierarchically adjacent functional layer.

In some embodiments, plurality of functional layers comprise a mission planning functional layer, a behavior planning functional layer, and a motion planning functional layer.

In some embodiments, at least one of the one or more neural networks of the mission planning layer is associated with the functional task of determining an optimal route for the vehicle or the mobile robot.

In some embodiments, at least one of the one or more neural networks of the behavior planning functional layer is associated with a functional task associated with at least one behavior of the vehicle or the mobile robot In some embodiments, at least one of the one or more neural networks of the behavior planning functional layer is associated with controlling a vehicle subsystem to execute one or more of the functional tasks of: changing a lane, waiting at an intersection, passing another vehicle or mobile robot, giving way to the another vehicle or mobile robot, or waiting at an intersection.

In some embodiments, at least one of the one or more neural networks is associated with controlling a vehicle subsystem to execute at least one of the functional tasks of avoiding an obstacle, finding a local path, or controlling the speed, direction or position of the vehicle or the mobile robot In some embodiments, the sensor data includes one or more of image data, LIDAR data, RADAR data, global positioning system (GPS) data, inertial measurement unit (IMU) data, and processed sensor data.

In some embodiments, the input data includes data sensed from the one or more of the camera, the LIDAR system, RADAR system, the GPS, and the IMU system.

In some embodiments, at least one of the one or more neural networks can be trained offline from the control system before or during operation of the control system.

In some embodiments, the vehicle comprises an autonomous vehicle, autonomous robot, or autonomous drone.

In some embodiments, the motion planning layer is associated with the functional task of controlling the operable elements of a steering unit, a throttle unit, or a brake unit.

In some embodiments, the computer instructions cause the at least one processor to compile all of the implemented functional tasks to control the at least one of the operable elements wherein the at least one operable element is one or more of a GPS unit, steering unit, a brake unit, or a throttle unit.

In some embodiments, more than one of the functional tasks is associated with operation of a same one or more of the operable elements wherein the at least one operable element is one or more of a GPS unit, steering unit, a brake unit, a throttle unit.

In another aspect of the present disclosure, there is disclosed a method of controlling operation of a vehicle or mobile robot, the method implemented by at least one processor. The method includes providing in memory a plurality of feed-associated functional layers, each of the plurality of feed-associated functional layers comprising one or more neural networks, each of the one or more neural networks associated with at least one functional task for controlling operation of at least one operable element of the vehicle or the mobile robot. The method also includes providing input data to each one of the one or more neural networks of each functional layer. The method also includes executing each of the one or more neural networks, for each feed-associated functional layer, to generate output data based on the input data for controlling operation of the at least one operable element associated with the functional task associated with each of the one or more neural networks. The input data comprises sensor data sensed by a plurality of sensors of the vehicle or mobile robot and output data of at least one neural network of one of the plurality of feed-associated functional layers.

In some embodiments, the instructions for performing the method are stored on a non-transitory computer readable medium containing instructions executable by at least one processor.

In another aspect of the present disclosure, there is disclosed a computer program product comprising instructions. When the program is executed by a computer, the instructions cause the computer to carry out the steps of controlling operation of a vehicle or mobile robot. The steps include providing in memory a plurality of feed-associated functional layers, each of the plurality of feed-associated functional layers comprising one or more neural networks, each of the one or more neural networks associated with at least one functional task for controlling operation of at least one operable element of the vehicle or the mobile robot. The steps further include providing input data to each one of the one or more neural networks of each functional layer and executing each of the one or more neural networks, for each feed-associated functional layer, to generate output data based on the input data for controlling operation of the at least one operable element associated with the functional task associated with each of the one or more neural networks. The input data comprises sensor data sensed by a plurality of sensors of the vehicle or mobile robot and output data of at least one neural network of one of the plurality of feed-associated functional layers Some example embodiments relate to a multi layer learning based planning system and method for mobile robots and/or autonomous vehicles.

Example embodiments relate to a multi layer learning based planning computing system and method for an autonomous vehicle or mobile robot. A mission planning layer, behavior planning layer and motion planning layer are used to develop an optimal route for the autonomous vehicle or mobile robot, provide a series of functional tasks to follow the planned optimal route and develop commands to implement the functional tasks. At least one of the functional tasks is performed through machine learning.

An example embodiment is a planning computing system for a vehicle or mobile robot, the vehicle or mobile robot including at least one operable element, the planning computing system includes: memory; at least one processor in communication with the memory and configured to execute computer instructions stored on the memory. The computer instructions cause the at least one processor to: implement a plurality of hierarchical planning functional layers, wherein each planning functional layer is feed-associated with at least one hierarchically adjacent planning functional layer, wherein each planning functional layer includes at least one functional task, wherein at least one functional task is performed through machine learning, and wherein at least one of the functional tasks is associated with operation of at least one of the operable elements of the vehicle.

In an example embodiment, said implementing the plurality of hierarchical planning functional layers comprises predesignating a name and hierarchy of each of the hierarchical planning functional layers.

In an example embodiment, at least one of the planning functional layers further comprises planning functional sub-layers, each planning functional sub-layer comprising at least one of the functional tasks, and each planning functional sub-layer is feed-associated with a hierarchically adjacent planning functional sub-layer.

In an example embodiment, at least one of machine learning and rule-based learning is applied to at least one of the hierarchical planning functional layers.

In an example embodiment, at least one of machine learning and rule-based learning is applied to at least one of the functional tasks.

In an example embodiment, said feed-associated comprises at least one of feed-forward or feedback.

In an example embodiment, the computer instructions cause the at least one processor to apply machine learning to separately train all of the hierarchical planning functional layers.

In an example embodiment, each planning functional layer is feed-associated with only a hierarchically adjacent planning functional layer or layers.

In an example embodiment, the plurality of hierarchical planning functional layers comprises a mission planning layer, a behavior planning layer, and a motion planning layer.

In an example embodiment, the mission planning layer comprises the functional task of defining an optimal route for the vehicle or mobile robot. In an example embodiment, the behavior planning layer comprises at least one behavior of the vehicle, defined as a functional task. In an example embodiment, the at least one functional task comprises one or more of: changing a lane, waiting at an intersection, passing a vehicle, giving way to a vehicle, or waiting at an intersection.

In an example embodiment, the motion planning layer defines at least one functional task for the vehicle, wherein the at least one functional task comprises one or more of avoiding an obstacle, finding a local path, and changing the speed, direction or position of the vehicle.

In an example embodiment, the computer instructions cause the at least one processor to further implement a safety function layer.

Another example embodiment is a method for planning for a vehicle, the method implemented by at least one processor, the method includes: implementing a plurality of hierarchical planning functional layers, wherein each planning functional layer is feed-associated with at least one hierarchically adjacent planning functional layer, wherein each planning functional layer includes at least one functional task; and applying machine learning to at least one functional task, wherein at least one of the functional tasks is associated with operation of at least one of the operable elements of the vehicle.

In an example embodiment, at least one of the planning functional layers further comprises planning functional sub-layers, each planning functional sub-layer comprising at least one of the functional tasks, and each planning functional sub-layer is feed-associated with a hierarchically adjacent planning functional sub-layer.

In an example embodiment, at least one of machine learning and rule-based learning is applied to at least one of the hierarchical planning functional layers.

In an example embodiment, at least one of machine learning and rule-based learning is applied to at least one of the functional tasks.

In an example embodiment, said feed-associated comprises at least one of feed-forward or feedback.

In an example embodiment, the plurality of hierarchical planning functional layers comprises a mission planning layer, a behavior planning layer, and a motion planning layer.

In an example embodiment, the mission planning layer comprises the functional task of defining an optimal route for the vehicle or mobile robot.

In an example embodiment, the behavior planning layer comprises at least one behavior of the vehicle, defined as a functional task.

In an example embodiment, the motion planning layer defines at least one functional task of the vehicle.

In an example embodiment, the method further includes implementing a safety function layer.

Another example embodiment is a non-transitory computer readable medium containing instructions executable by at least one processor, the instructions comprising instructions for performing the described methods.

Another example embodiment is a planning system for a vehicle, the vehicle including at least one operable element, the planning system including: memory; at least one processor in communication with the memory and configured to execute computer instructions stored on the memory. The computer instructions causing the at least one processor to: define a plurality of planning functional layers, wherein each planning functional layer includes at least one functional task, the planning functional layers comprising a mission planning layer, a behavior planning layer, and a motion planning layer, and wherein at least one functional task is performed through machine learning, wherein at least one of the functional tasks is associated with operation of at least one of the operable elements of the vehicle.

BRIEF DESCRIPTION OF THE DRAWINGS

Example embodiments will now be described by way of examples with reference to the accompanying drawings, in which like reference numerals may be used to indicate similar features, and in which.

DETAILED DESCRIPTION OF EXAMPLE EMBODIMENTS

Various existing methods for vehicle control include rule based methods, methods based on search algorithms and methods based on finite state machines (FSMs).

At least some example embodiments relate to a multi layer planning architecture system and method for mobile robots and/or autonomous vehicles.

At least some example embodiments relate to systems and methods to plan routes for autonomous vehicles or mobile robots and to navigate and control autonomous vehicles or mobile robots using a plurality of neural networks.

Figure 1:
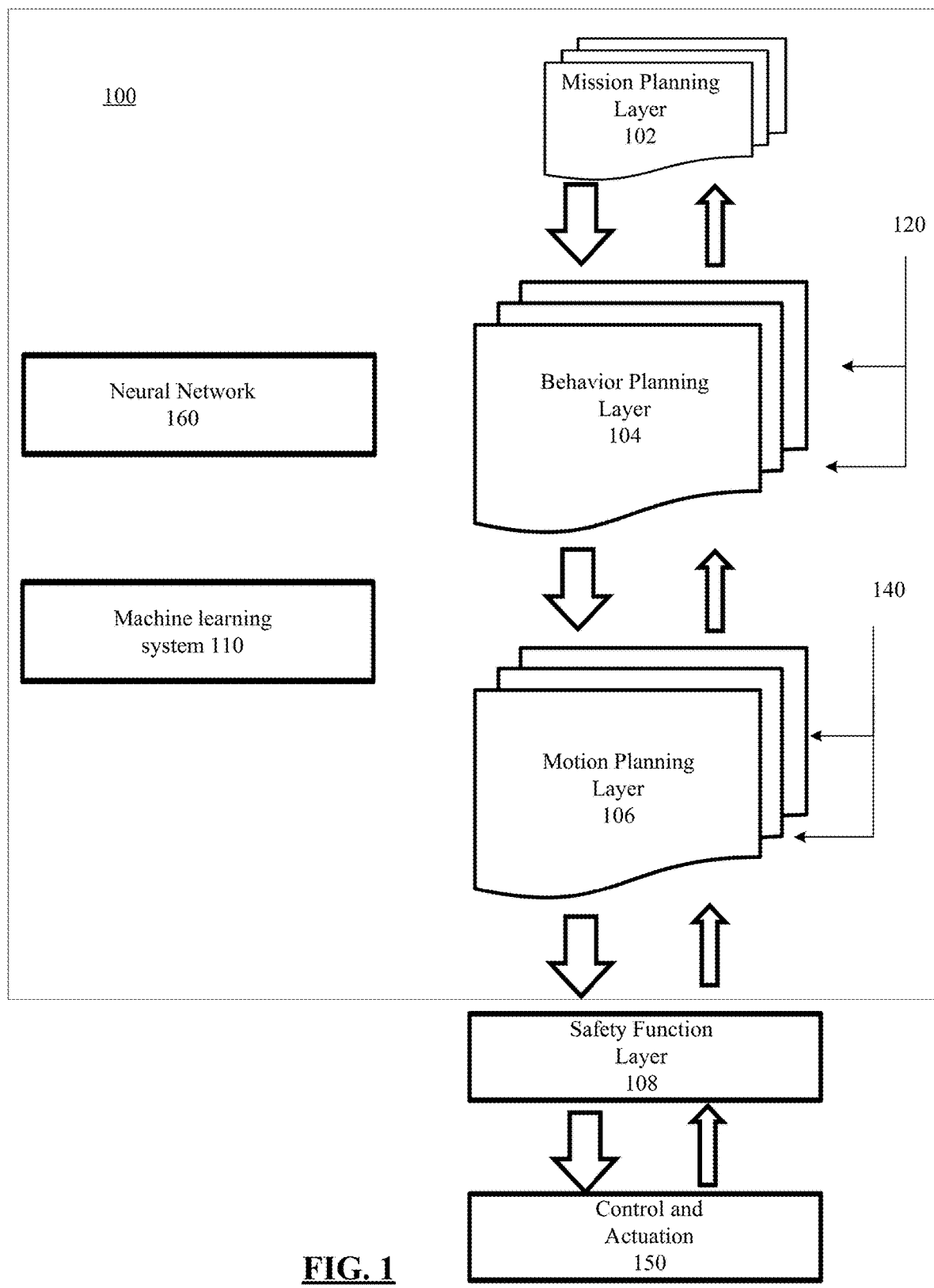
FIG. 1 is a block diagrammatic view of an example planning computing system, in accordance with an example embodiment.

FIG. 1 illustrates an example embodiment of a multi layer planning computing system 100 for navigating and controlling an autonomous vehicle (or mobile robot) in accordance with an example embodiment. Generally, the system 100 is configured to define a plurality of hierarchical planning functional layers or levels. Each planning functional layer is feed-associated with at least one hierarchically adjacent planning functional layer, and each planning functional layer includes one or more functional tasks. A functional task may include planning or performing an action, and may include operating the system 100 or a device or subsystem of the autonomous vehicle. As shown in FIG. 1, the planning computing system 100 includes a mission planning functional layer 102, a behavior functional planning layer 104, a motion functional planning layer 106, wherein the mission planning functional layer 102 is hierarchically adjacent to the behavior planning functional layer 104, and the behavior planning functional layer 104 hierarchically adjacent to the motion planning functional layer 106. In the example shown in FIG. 1, the mission planning functional layer 102 stands highest in the hierarchy. The mission planning functional layer 102 is for determining an optimal or suitable route from an initial geographical position to one or more end points for the autonomous vehicle.

More than one end point may be planned at a time, for example different stops. The behavior planning layer 104 is for defining a series of functional tasks for the autonomous vehicle or mobile robot to follow the planned route determined to be optimal by the mission planning layer 102. The motion planning functional layer 106 is responsible for defining a local path for the autonomous vehicle or mobile robot taking into account the series of functional tasks defined by the behavioral planning functional layer 104 and taking into account the optimal route defined by the mission planning functional layer 102. In example embodiments, each functional planning layer 102, 104, 106 can comprise hardware and/or software, and interact with vehicle subsystems, and operable elements of the vehicle, described in greater detail herein. In example embodiments, planning computing system 100 may be separately feed-associated with control and actuation system 150 which comprises hardware and or software that can interact with vehicle subsystems and operable elements of the vehicle.

Figure 5:
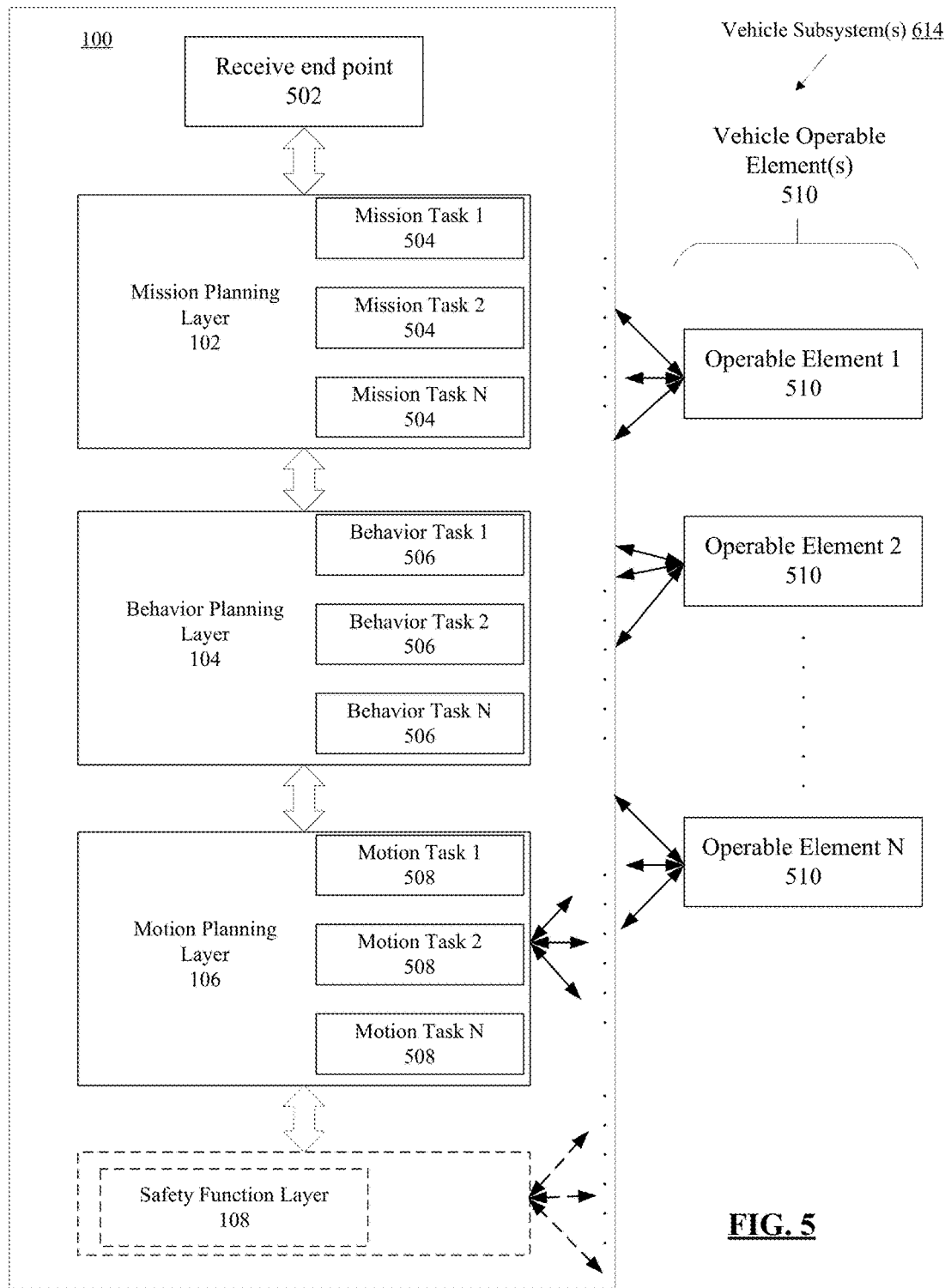
FIG. 5 shows a block diagrammatic view of an example integrated planning computing and control and actuation system, in accordance with an example embodiment.

Referring now to FIG. 5, an example integrated planning computing and control system 500 is shown. During online operation/execution, planning computing system 100 computes a plan for the vehicle based on the collective operation of planning functional layers 102, 104, 106. Control and actuation system 150 is configured to implement the plan to an end point, and is further configured to control vehicle operable elements 510 of the vehicle in accordance with the relevant functional task(s) to be performed, and/or to receive feedback information from the vehicle operable elements 510. As shown in FIG. 5, based on the end point of the vehicle 502 determined by mission planning layer 102, functional tasks 504, 506, implemented by mission planning functional layer 102, behavior planning functional layer 104 and functional tasks 508 implemented by motion planning functional layer 106, control and actuation system 150 is configured to operate at least one vehicle operable element 510 of the vehicle based on at least one or several functional tasks 504, 506, 508.

Figure 3:
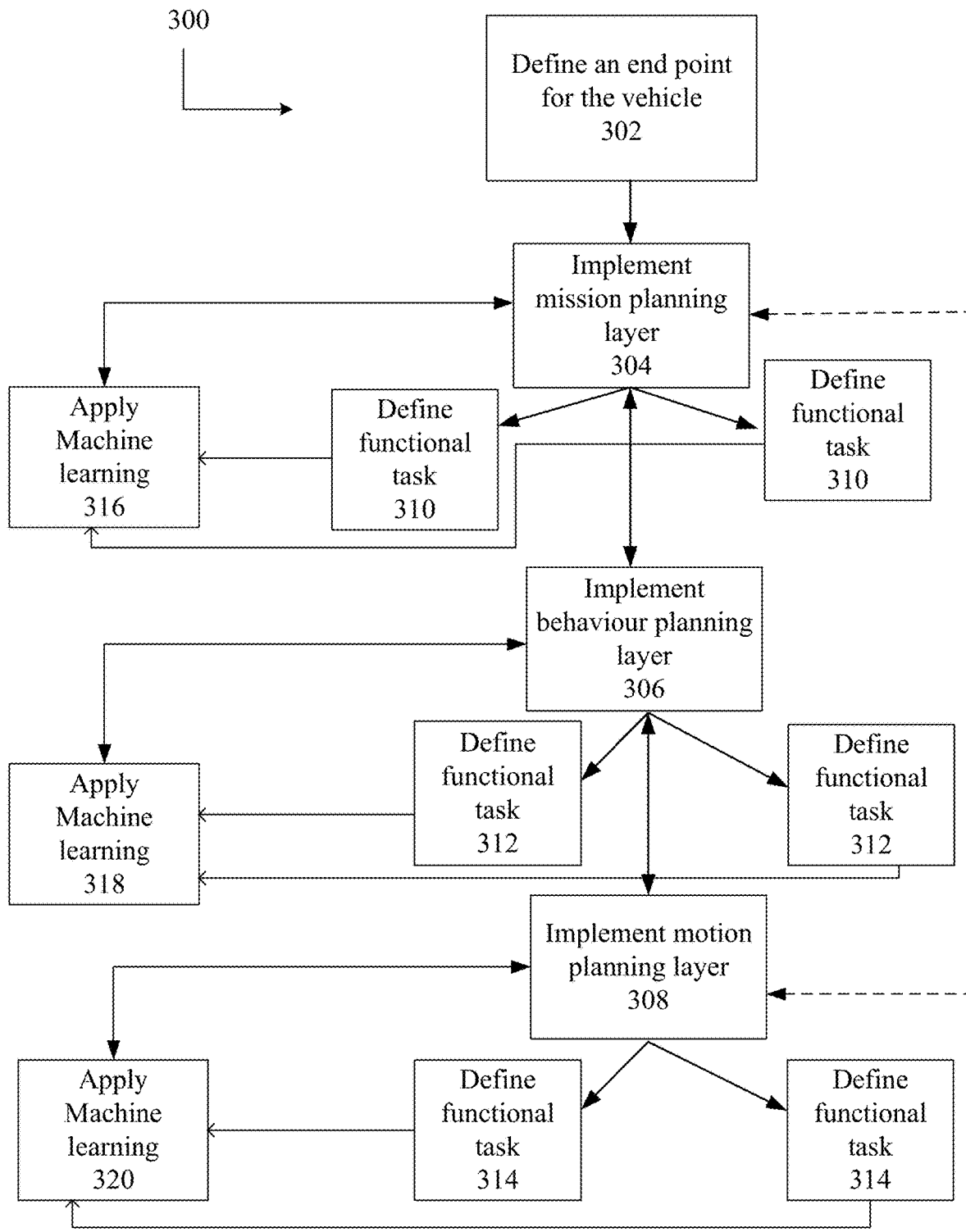
FIG. 3 is a flow diagram for a method of operation of a planning computing system, in accordance with an example embodiment.

FIG. 3 is a flow diagram for a method 300 of machine learning for the planning computing system 100, for an autonomous vehicle or mobile robot, in accordance with an example embodiment. At event 302, the method 300 includes defining an end point for the autonomous vehicle or mobile robot. At events 304, 306, and 308, the method 300 includes implementing a plurality of hierarchical planning functional layers, for example a mission planning functional layer, a behavior planning functional layer and a motion planning functional layer. This can include predesignating the number of planning functional layers, the general designation (e.g. name and general responsibility) of each of the planning functional layers, and/or the hierarchal order of the planning functional layers. In the method 300, each planning functional layer can include at least one functional task which can be defined 310, 312, 314 by or associated with the hierarchical planning functional layers 304, 306, 308. Each functional task is associated with operation of at least one vehicle operable element 510 (FIG. 5) of the vehicle. At events 316, 318, 320, the method 300 includes applying machine learning to implement or perform at least one or all of the hierarchical planning functional layers and functional tasks associated with each hierarchical planning functional layer. In example embodiments, a combination of machine learning and rule-based learning is applied to perform or implement at least one of the hierarchical planning functional layers and at least one of the functional tasks. Each of the planning functional layers may further have predesignated the functional tasks which are to performed within that planning layer, and have predesignated the general designation of each functional task. Machine learning may be applied to perform or implement these predesignated functional tasks within the particular planning functional layer at events 316, 318, 320, in an example embodiment. Instructions for performing method 300 may be contained in a non-transitory computer readable medium which contains a processor configured to execute these instructions. In some embodiments, control and actuation system 150 may be replaced with vehicle subsystem 614, which may include some or all of the functionality of control and actuation system 150 as described herein.

In an example embodiment, the mission planning layer 102 specifies or defines an end point or end points for the autonomous vehicle or mobile robot and includes one or more mission functional tasks for determining an optimal route for the autonomous vehicle or mobile robot from an initial point to the end point. In an example embodiment, the mission planning functional layer 102 determines the optimal route for the autonomous vehicle or mobile robot based on a digital map of a surrounding environment. The digital map of the surrounding environment may be pre-existing data obtained from a commercial map data repository and may be unified map data obtained by a combination of Radar, LIDAR and vision systems. The mission planning functional layer 102 determines an optimal or suitable route to the end point. In an example embodiment, the mission planning functional layer 102 includes one or more mission sub-layers, for example to achieve multiple end points for a specific trip. In an example embodiment, checkpoints along the route are generated by the mission planning layer 102. Each checkpoint may correspond to a functional task. In an example embodiment, the task of finding an optimal route, calculating tariffs/tolls, calculating traffic, calculating estimated time of arrival, are examples of mission planning layer functional tasks.

Referring again to FIG. 1, each planning functional layer 102, 104, 106 can include a plurality of sub-layers. Each sub-layer may correspond to, for example, a specific command or functional task. In at least some embodiments each sub-layer has a feed-association (e.g. feed forward and/or feedback) with one or more hierarchically adjacent sub-layers. In an example embodiment, sub-layers may collectively represent a sequence of planned functional tasks to be computed and performed.

In at least some embodiments, the mission planning functional layer 102 includes a processor (not shown) to determine the optimal or suitable route for the autonomous vehicle or mobile robot by assessing various factors including driving rules, distance to end point and a determination of the shortest distance to the end point or the shortest time to the end point giving the presence of any fixed obstacles between the autonomous vehicle or mobile robot and the end point. The mission planning layer functional 102 can determine the optimal route using search algorithms, for example A* search algorithms, bidirectional search algorithms or the like, as understood in the art.

Figure 2:
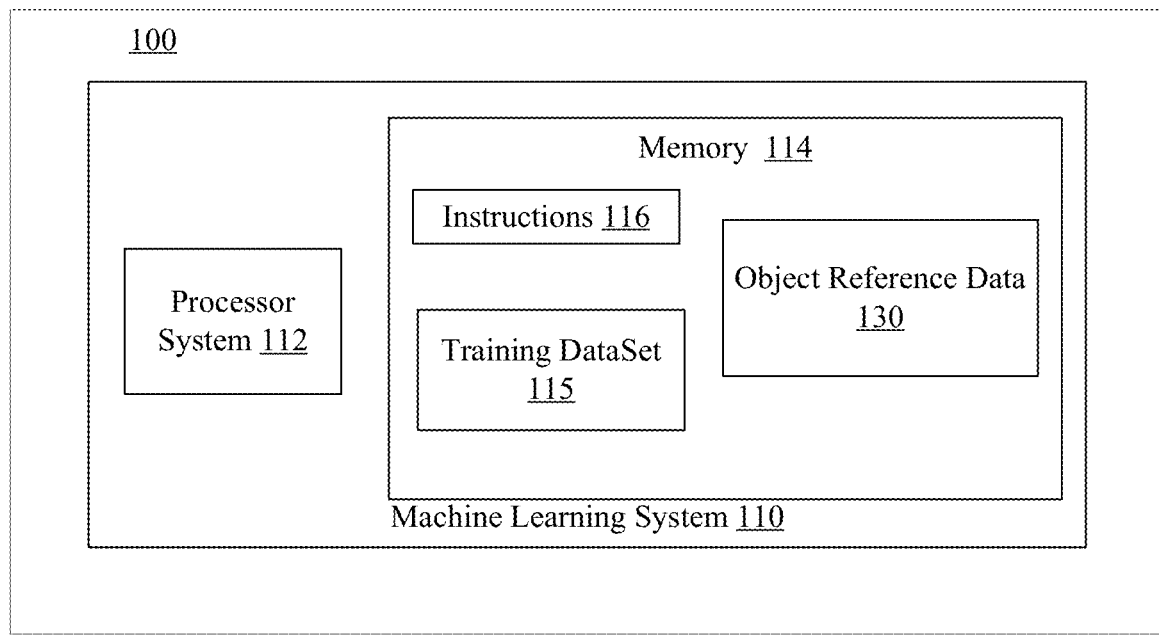
FIG. 2 is a block diagrammatic view of an example machine learning system, in accordance with an example embodiment.

The planning computing system 100 includes machine learning system 110 illustrated in FIG. 2 which may be used by at least one or all of the mission planning layer 102, the behavior planning layer 104, and the motion planning layer 106. In an example embodiment, each layer 102, 104, 106 independently applies machine learning 304, on each layer and separate from the other layers, to perform or implement functional tasks for that particular planning functional layer. In an example embodiment, each planning functional layer 102, 104, 106 and their functional tasks are predesignated, with machine learning 304 being independently performed on each planning functional layer and its particular functional tasks.

Machine learning system 110 includes a digital processor 112 that may include one or more digital processing units. Machine learning system 110 also includes memory 114 that has one or more transient and non-transient digital memory storage elements. Computer executable instructions 116 are stored in the memory 114 that configure the processor 112 and machine learning system 110 to perform the functions as described herein.

In at least some example embodiments, a training dataset 115 is also stored in memory 114. Training dataset 115 includes base set of data that the machine learning system 110 can build on and refine to create and update object reference dataset 130 for the planning functional layers 102, 104, 106. For example, the mission planning functional layer 102 may use the reference dataset 130 to determine the optimal route for the autonomous vehicle or mobile robot. The resulting optimal route determined by the mission planning functional layer 102 may be stored in memory 114 or another memory for access by other layers of the planning system 100.

Machine learning system 110 may also use reinforcement learning or other machine learning techniques as understood in the art, including options graph based learning, to develop the training data set 115. By using machine learning, the planning system 100 may be capable of learning how to react based on previous situations experienced by the vehicle. These experiences may be transferable and the vehicle may learn how to respond to a particular situation without individually experiencing that situation. The planning system 100 may also be able to generalize learned situations to unknown situations more easily.

In at least some embodiments, machine learning system 110 can be used by the mission planning functional layer 102 to determine the optimal route for the autonomous vehicle or mobile robot based on previous experiences as well as the state of the digital map of the environment accessed by the mission planning layer 102.

Further referring to FIG. 1, the behavior planning functional layer 104 may include a processor (not shown here) that is configured to access memory 114 or another memory to obtain the optimal route developed by the mission planning functional layer 102. The processor of the behavior planning functional layer 104 then assesses the planned route and provides a series of functional tasks or behaviors for the autonomous vehicle or mobile robot to follow the planned route. The behavior planning functional layer 104 may include a plurality of behavior sub-layers. Each behavior sub-layer may correspond to, for example, a behavior, defined as a specific functional task. These functional tasks may include a variety of driving actions such as changing lanes, passing a vehicle or moving object, yielding to a vehicle or moving object, waiting at an intersection or maneuvering around a static object.

The behavior planning functional layer 104 assesses the optimal route and additional factors such as the surrounding environment, applicable driving rules, the presence of dynamic obstacles including vehicles and pedestrians, road constraints such as the number of lanes in a road and speed limits, safety concerns, and passenger convenience to define and select the appropriate functional tasks to enable the autonomous vehicle or mobile robot to navigate the route. This can include operating of vehicle subsystems and vehicle operable elements. In at least some embodiments, the behavior planning functional layer 104 therefore further comprises multiple functional tasks 120 wherein each functional task corresponds to an action undertaken at the behavior planning layer 104. The behavior planning layer 104 may perform each functional task 120 by accessing hardware or software (not shown here) to determine the feasibility of a proposed functional task or behavior and the potential benefit or disadvantage of taking that behavior. For example, the behavior planning layer 104 upon evaluating a proposed functional task of waiting at an intersection may revise that functional task upon acquiring information that the intersection does not include a stop sign or traffic lights.

The behavior planning functional layer 104 may be feed-associated with the mission planning layer 102. Feed association can include feed-forward and/or feedback of information, control, and/or metadata, for example. Information obtained by the behavior planning functional layer 104 can be sent to the mission planning functional layer 102 by being stored in memory 114 or another memory source, to refine or evaluate the optimal route. For example, the mission planning functional layer 102 may refine the optimal route to reduce the number of left turns should the behavior planning functional layer 104 detect increased traffic. The optimal route may also be dynamically refined by mission planning functional layer 102 taking into account information obtained by behavior planning functional layer 104 and motion planning functional layer 106.

The functional tasks associated by the behavior planning functional layer 104 may be performed through machine learning system 110 as described herein, to for example determine the functional tasks required to navigate the planned optimal route for the autonomous vehicle or mobile robot.

Referring again to FIG. 1, the planning system 100 includes a motion planning functional layer 106 responsible for defining a local path to follow and determining commands such as steering and speed control commands for controlling the vehicle. In an example embodiment, the motion planning functional layer 106 is feed-associated with the behavior planning functional layer 104 by a shared memory (not shown) between the planning functional layers 104, 106 or any other layer. The motion planning functional layer 106 may include a plurality of motion sub-layers which can each represent one or more functional tasks 140. The motion planning functional layer 106 provides the step-by-step instructions for the vehicle to navigate the planned optimal route in a controlled manner that avoids obstacles. In at least some embodiments, the motion planning functional layer 106 may comprise at least one functional task 140 that corresponds to a specific command such as turn left, turn right, go straight ahead (follow the road), avoid an obstacle, find a local path or perform the requested behavior as implemented by planning functional layer 104. In at least some embodiments each motion functional task 140 corresponds to a behavior functional task 140 through a feed-association between motion planning functional layer 106 and behavior planning functional layer 104. The motion planning functional layer 106 assesses a functional task 130 implemented by the behavior planning layer 104 and considering the surrounding environment and the speed, direction, position or other parameters of the vehicle decide a motion functional task 140 to achieve the desired behavior. The motion planning layers may perform the functional tasks passed by the behavior planning functional layer 104. The motion planning functional layer 106 may accomplish this by defining a local path or short distance trajectory from the vehicle's position to an intermediate goal position. The intermediate goal position or checkpoint may be passed by the behavior planning functional layer 104 or defined by the motion planning functional layer 106 considering variables such as the surrounding environment, safety, passengers' comfort, driving rules. The local path may include a series of desired positions, speed and direction of the vehicle at each position.

For example, the behavior functional task 140 for changing lanes could require a motion functional task 130 corresponding to changing direction to merge into a lane. In the event a vehicle is located in the same space, the motion planning functional layer 106 may include an additional motion functional task 140 corresponding to a command for slowing down the vehicle for a series of motion functional tasks corresponding to slowing down the vehicle and changing directions. Motion planning functional layer 106 also uses machine learning system 110 and machine learning approaches as described herein for individually training itself, to determine and perform the appropriate motion functional task 140 to navigate the planned optimal route.

Information acquired by the mission planning functional layer 102, the behavior planning functional layer 104 and the motion planning functional layer 106 may be shared between each of the other adjacent planning functional layers and may be used to refine the functional tasks of each planning functional layer. In some embodiments, information acquired by each planning functional layer may be stored in memory and accessed by one or more other layers thus sharing the information between layers. Each layer may be feed-associated only with the layer above and/or below it, by way of a shared memory or other means. In some examples, the motion planning layer 106 may provide feedback indirectly to the mission planning layer 102 which passes through the behavior planning layer 104 without any additional action by the behavior planning layer 104, and may in turn receive information indirectly from the mission planning layer 102 as a pass-through without any additional action by the behavior planning layer 104.

In at least some embodiments, the planning system 100 further includes a safety function layer 108 providing a safety function for the planning system 100. In an example embodiment, the safety function layer 108 is feed-associated with the motion planning functional layer 106. The safety function layer 108 is responsible for assessing the functional tasks 140 of the motion planning functional layer 106 and determining whether these functional tasks 140 are safe, considering factors such as the surrounding environment, road constraints and the like. In an example embodiment, the safety function layer 108 includes one or more functional tasks that are each individually performed through machine learning 304. As an example, the safety function layer 108 may override a motion functional task 140 corresponding to following a specified local path if another vehicle or object is detected, thus avoiding a collision.

The autonomous vehicle or mobile robot includes at least one vehicle operable element 510 (FIG. 5), and typically a plurality of vehicle operable elements 510 (FIG. 5). The operable element 510 may include an electrical element, a mechanical element, a chemical element, a chemical reaction element, and/or an electromechanical element, and/or a combination thereof.

Selected one or more of the operable elements can be activated to perform a functional task in some examples. For example, the functional task can include steering the wheels, increasing speed, decreasing speed, activation of brake, activation of relevant lights. In some examples, the operable element can be operated to perform other functions such as detection/sensing of objects or environment, GPS localization, receiving road traffic volume, transmitting data, receiving data, communicating, etc. Such operations or actions may be performed by one operable element or by a combination of operable elements. At least some or all of the functional tasks include operation of one or more operable elements of the vehicle. Example operable elements therefore include, as part of a vehicle subsystem or stand-alone, sensors, actuators, motors, lights, power controls, transceivers, transmitters, receivers, communication subsystems, and/or combustion chambers (e.g. for fuel combustion reaction activation and associated control).

Figure 4:
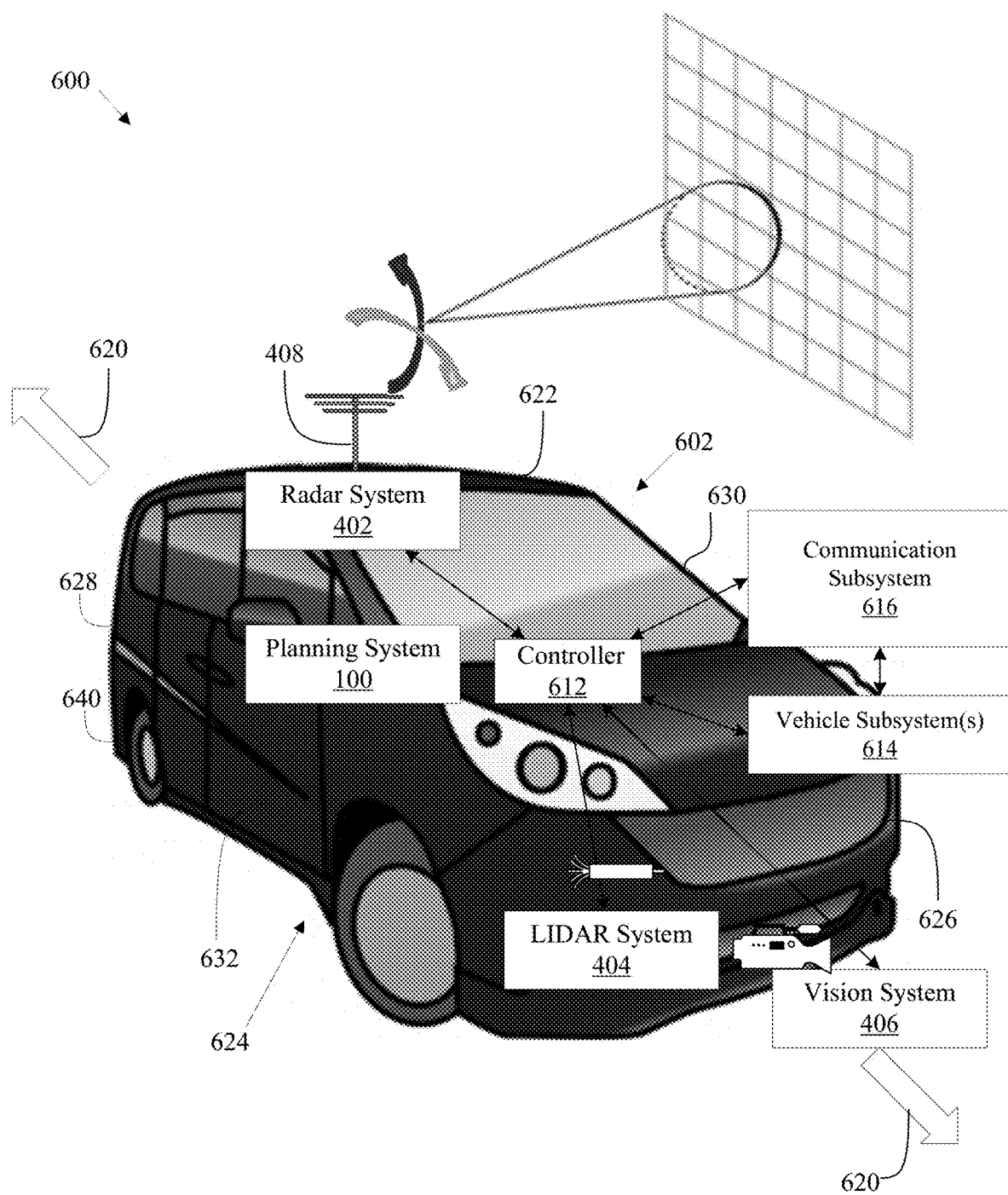
FIG. 4 shows a right perspective diagrammatic view of an example planning computing system for a vehicle, in accordance with an example embodiment.

FIG. 4 shows a perspective diagrammatic view of an example planning system 600 including a vehicle 602 which may include at least one of a radar system 402, a LIDAR system 404, and a vision system 406. As shown in FIG. 4, the vehicle 602 can be an automobile in an example embodiment, and the radar system 402 includes at least one antenna 408 mounted on the vehicle 602. Generally, the system 600 can be used for planning when the vehicle 602 is moving, as described in embodiments herein.

The system 600 further includes at least one controller 612. The system 600 may also include other vehicle subsystems 614 which may further include machine learning system 110, and the controller 612 (e.g. one or more processors) is configured to perform the operations described herein including operating each of the mission planning layer 102, the behavior planning layer 104 and the motion planning layer 106. In an example embodiment, each planning functional layer 102, 104, 106 can be implemented by its own processor. In another example embodiment, a processor or multi-processor is configured to implement the planning functional layers 102, 104, 106. Vehicle subsystem(s) 614 are operably connected to the controller 612. Vehicle subsystem(s) 614 may also include an autonomous driving controller (not shown) for the vehicle 602.

The controller 612 can be configured to receive and send data from and to the radar system 402, the LIDAR system 404, the vision system 406, and the vehicle subsystem 614 including the machine learning system 110. The controller 612 may include at least one data recording process for storing data captured from the radar system 402, the LIDAR system 404, the vision system 406, and/or any of the vehicle subsystems 614, and/or data processed therefrom to memory including memory 114.

Controller 612 can also be configured to process the data in the manner described above to develop a plan for an autonomous vehicle by generating a mission planning layer 102, a behavior planning layer 104 and a motion planning layer 106. Controller 612 may be further configured to use the mission instructions generated by the mission planning layer 102, the behavior planning layer 104 and the motion planning layer 106 for automated vehicle guidance.

In an example embodiment, a vehicle subsystem 614 can receive a command from the controller 612 in order to perform the particular command based on data detected by the radar system 402, the LIDAR system 404 or the vision system 406. In an example embodiment, data or unified map information may be sent to the vehicle subsystem 614, such as information in relation to the static environment, a static object or a dynamic object. The data can also include the identification of the object, and can include other pertinent information about the object such as its speed and vector. The vehicle subsystem 614 can be configured to, in an example embodiment, receive and interpret that received data and execute its own command function in response, for example, determining a planned optimal route for the autonomous vehicle. Some vehicle subsystems 614 can include output interface subsystems (e.g. displays, heads-up displays, monitors, projectors, and/or speaker output, etc.) which include pertinent data about a detected object or environment, or a specified action or command to be taken by the driver or another vehicle subsystem 614. Some vehicle subsystems 614 can include input interface subsystems, such as touchscreen, microphone for voice input, steering control, and/or pedal control, etc. The planning system 600 may also include a communication subsystem 616 which controls the communications between the subcomponents of the system 600.

Time of flight of the electromagnetic waves can be used to determine environment and objects around the vehicle 602. The determination of environment and objects can further be calculated based on the speed, vector and location of the vehicle 602, along with other information known to the controller 612. For example, speed, vector and location information of the vehicle 602 can be determined from speedometers and/or GPS. Therefore, the absolute or relative speed of other objects can be determined, including their direction of travel. As well, the location of other objects and environment can be determined. Doppler effects based on the relative speed of the vehicle 602 can also be used as part of the calculations, as would be understood in the art.

As shown in FIG. 4, the vehicle 602 is configured to move in a direction of travel 620, for example using a motor drive and wheels in the case of an automobile to move horizontally forward or backward, in various paths to arrive at a destination. As shown in FIG. 4, the body of the vehicle 602 includes a top 622, bottom 624, front side 626 and rear side 628, and sides 630, 632 as well as a rear bumper 640.

The vehicle 602 can comprise a shell which generally surrounds the vehicle 602. In an example embodiment, at least part of the shell can be formed of radio wave transmissive material such as rubber, plastic, composite or polymer.

The vehicle 602 can, in example embodiments, be ground-based including an automobile, truck, tractor, bus, motorcycle, locomotive, subway, hovercraft, snowmobile or heavy equipment vehicle. The vehicle 602 can, in example embodiments, be a water-based vehicle such as a boat, hovercraft, or jet ski. The vehicle 602 can, in example embodiments, be a flying-based vehicle such as a jet, helicopter or unmanned aerial vehicle (UAV). Further, in some example embodiments, the mapping vehicle used with the system 100 could also be any of these vehicles. In some example embodiments, the vehicle 602 comprises a fully autonomous vehicle or a semi-autonomous vehicle. A mobile robot may be used in some example embodiments, which includes an automatic machine that is capable of locomotion, e.g., using any of the above vehicle mechanisms or robotic legs.

In example embodiments, the controller 612 is configured to use the data from radar system 402, LIDAR system 404 and vision system 406 to provide unified map data about the environment of vehicle 602 which may be used by the mission planning layer 102 housed in vehicle sub-system 614 to generate a planned optimal route for the vehicle 602.

Figure 6:
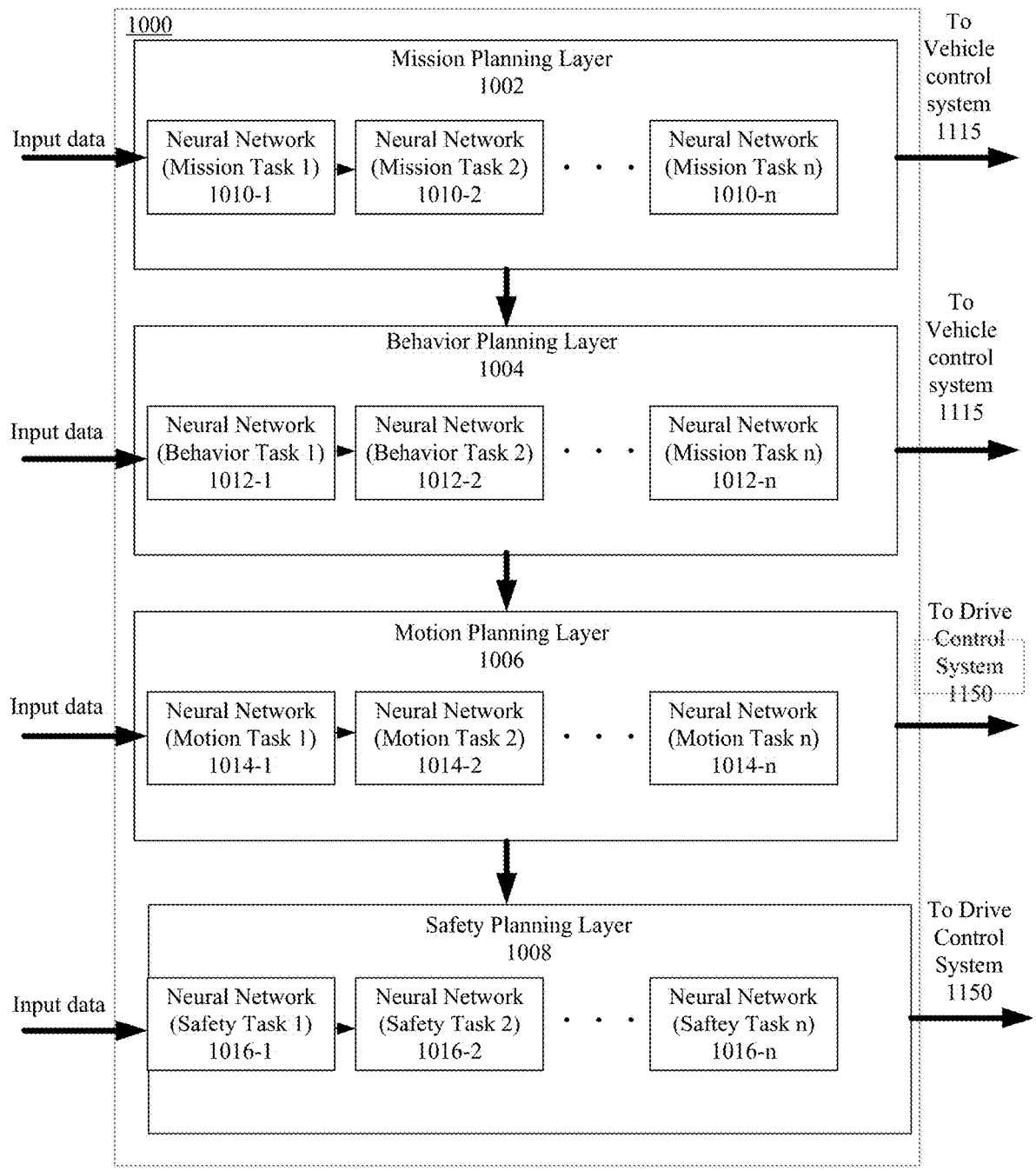
FIG. 6 is a block diagrammatic view of a control system, in accordance with another example embodiment.

Reference is now made to FIG. 6, which shows a multi-layer planning system 1000 for a vehicle (referred to hereinafter as system 1000) in accordance with another example embodiment. Generally, the system 1000 includes a plurality of planning layers or levels. Each planning layer or level includes one or more neural networks. Each neural network of each planning layer is associated with a different functional task for autonomous operation of a mobile robot or vehicle. Each respective neural network receives data and generates output data associated with the functional task associated with the respective neural network. One or more of the planning layers are feed-associated with at least one of the other planning layers by one or more of feed-forward or feedback between the respective planning layers. Thus, output data of one or more neural networks of a planning layer may be shared with one or more different planning layers as a way of providing additional input data to one or more neural networks of the one or more different planning layers. Also, the one or more of the neural networks of a planning layer may be feed-associated with one or more of the other neural networks of the same planning layer. Output data of one or more neural networks of a planning layer may be shared between different neural networks of the same planning layer as a way of providing additional input data for the one or more neural networks of same planning layers.

A functional task may include planning or performing an action, and may include operating the system 1000 or a device or subsystem of an autonomous vehicle such as vehicle 1105.

As shown in FIG. 6, the system 1000 includes a mission planning layer 1002, a behavior planning layer 1004, a motion planning layer 1006, and a safety planning layer 1008. The mission planning layer 1002 includes a plurality of neural networks 1010-1, 1010-2 . . . 1010-*n*, each associated with a different functional task. In the embodiment shown in FIG. 6, the functional tasks of the mission planning layer 1002 include mission tasks, such as for example specifying or defining an end point or end points for the autonomous vehicle or mobile robot, determining an optimal route for the autonomous vehicle or mobile robot from an initial point to the end point(s), defining one or more checkpoints along the optimal route, and calculating any associated tariffs/tolls. Thus, the neural network 1010-1 is associated with mission task 1, the neural network 1010-1 is associated with mission task 2, and so on. Each mission task of the mission planning layer neural network 1010 is executed by using vehicle control system 1115. Optimization can include optimization of one or a combination of: time; distance; cost (including tariffs/tolls and energy cost); fuel consumption; energy consumption (including battery or fuel); type of road (e.g. maximize highway versus maximize local road); or environmental and road conditions.

The behavior planning layer 1004 also includes a plurality of neural networks 1012-1, 1012-2 . . . 1012-*n*, each associated with a different behavior task. In the embodiment shown in FIG. 6, the functional tasks of the behavior planning layer 1004 include behavior tasks, such as for example changing lanes, passing a vehicle or moving object, yielding to a vehicle or moving object, waiting at an intersection, maneuvering around a static object, or signaling. Each behavior task of the behavior planning neural networks 1012 is similarly executed by vehicle control system 1115. Thus, the neural network 1012-1 is associated with behavior task 1, the neural network 1012-2 is associated with behavior task 2, and so on.

The motion planning layer 1006 also includes a plurality of neural networks 1014-1, 1014-2 . . . 1014-*n*, each associated with a different behavior task. In the embodiment shown in FIG. 6, the functional tasks of the motion planning layer 1006 include motion tasks, such as for example defining a local path to follow and determining commands such as steering and speed control commands for controlling of vehicle 1105 including commands such as turn left, turn right, go straight ahead (e.g., follow the road), avoid an obstacle, or find a local path. Each motion task of motion planning neural network 1014 may be executed by the drive control system 1150. Thus, the neural network 1014-1 is associated with motion task 1, neural network 1014-2 is associated with motion task 2, and so on.

The safety planning layer 1008 also includes a plurality of neural networks 1016-1, 1016-2 . . . 1016-*n*, each associated with a different safety task. In the embodiment shown in FIG. 6, the functional tasks of the safety planning layer 1008 include motion tasks, such as for example overriding or modifying a functional task associated with the motion planning layer 1006, or taking emergency action such as accelerating, braking or completing a rapid change in direction. Each safety task of safety planning neural network 1016 may be executed by the drive control system 1150. Thus, the neural network 1016-1 is associated with safety task 1, neural network 1016-2 is associated with safety task 2, and so on.

The mission planning layer 1002 is feed-associated with the behavior planning layer 1004, the behavior planning layer 1004 is feed-associated with the motion planning layer 1006, and the motion planning layer 1006 is feed-associated with the safety planning layer 1008 by one or more of feed-forward or feedback between the respective functional layers or one or more of the neural networks of the different functional layers. Thus, information may be shared between functional layers 1002, 1004, 1006 as a way of providing additional input data for the neural networks of each of the layers 1002, 1004, 1006. The neural networks within each of the functional layers 1002, 1004, 1006 may also be feed-associated with other neural networks within the same functional layer by one or more of feedback or feed-forward and may share input and output data with other neural networks of its functional layer and may also be feed associated with one or more neural networks of another functional layer.

As shown in FIG. 6, each functional layer of system 1000 comprises a plurality of neural networks that implement the functional tasks associated with the respective functional layer. The respective neural networks of the planning layers 1002, 1004, 1006 can be run or executed in parallel with the neural networks of a same or different planning layer. For example, a mission task 1 (corresponding to defining a checkpoint for the route) implemented by neural network 1010-1 within mission planning layer 1002 may be executed simultaneously with a behavior task 1 (corresponding to changing lanes) implemented by neural network 1012-1 within behavior planning layer 1004. Implementing a plurality of neural networks associated with each functional task as described herein may thus reduce the complexity of each neural network and may enable the neural networks to be executed in parallel, thus improving the speed of execution of control system 1000.

Referring again to FIG. 6, the operation of control system 1000 is described in detail. The mission planning layer 1002 is used for planning a suitable route from an initial geographical position to one or more end points for the autonomous vehicle based on data 1180 (FIG. 8) or other data that may be stored in a shared memory such as memory 1126. More than one endpoint may be planned at a time. For example there may be multiple different stops. When an endpoint is defined by mission planning layer 1002, mission planning layer 1002 is configured to break down the task of planning a route into a plurality of mission tasks 1, 2, . . . n, each associated with at least one neural network 1010-1, 1010-2, . . . 1010-*n*. The mission tasks may be a series of endpoints that taken as a whole define a suitable route to the final destination. The neural networks 1010 that define each of the functional tasks can feed forward their information to another neural network 1010 of the mission planning layer 1004 or can feed forward their information to one or more neural networks 1012 associated with behavior planning layer 1004 to provide an additional input for the neural networks associated with behavior planning layer 1004. In example embodiments, the neural networks may be feed associated by way of a shared memory between the respective neural networks of the same functional layer or other functional layers.

The behavior planning layer 1004 defines a series of behavior tasks 1, 2, . . . n, that mimic the actions or behavior of a human operator of a vehicle. As an example, this may include turning on a blinker, changing lanes, checking a side mirror or other tasks. Each behaviour task is implemented by at least one neural network 1012 as described herein. The neural networks 1012 associated with behavior planning layer 1004 may obtain data 1180 as well as data that has been fed-forward from the mission tasks implemented by the neural networks 1010 of mission planning layer 1002 or fed back from the motion tasks implemented by the neural networks 1016 of motion planning layer 1006. Behavior tasks may also feed forward their output to motion planning layer 1006. The respective neural networks and functional layers may be feed associated by way of a shared memory such as memory 1126.

The motion planning layer 1006 defines a series of motion tasks 1, 2, etc., based on data 1180 received from one or both mission planning layer 1002 and behavior planning layer 1004. Motion planning layer 1006 aggregates the data 1180 and passes this directly to a processor, such as processor 1102 which is part of vehicle control system 1115. Vehicle control system 1115 comprises hardware and/or software that can interact with vehicle subsystems and operable elements of the vehicle. Alternatively, the data may be passed directly to drive control system 1150 (from motion planning layer 1006 and safety planning layer 1008 or vehicle subsystem 1160 (mission planning layer 1002 and behavior planning layer 1004). In this respect, motion planning layer 1006 is responsible for implementing motion tasks 1, 2, . . . n, that are associated with controlling the operable elements, such as for example, operable elements 510 of an autonomous vehicle based on the operation of a plurality of neural networks 1016 that implement each of the motion tasks. The motion tasks implemented by neural networks 1016 associated with motion planning layer 1006 may use data 1180 and may also use as input data, data that has been fed-forward from the mission and behavior tasks implemented by one or both of the neural networks 1010, 1012 of mission planning layer 1002 and behavior planning layer 1004. System 1000 is configured to decide which of the functional tasks to implement based on which action is optimal.

In some embodiments, system 1000 may include a safety function layer 1008. In an example embodiment, the safety function layer 1008 is feed-associated with the motion planning layer 1006. The safety function layer 1008 is responsible for assessing the motion tasks of the motion planning layer 1006 and determining whether these motion tasks are safe, considering factors such as the surrounding environment, road constraints and the like. In an example embodiment, the safety function layer 1008 includes one or more safety tasks 1, 2, . . . n, that are each individually performed using a neural network 1016 as described herein. As an example, the safety function layer 1008 may override or modify a motion task corresponding to following a specified local path, for example if another vehicle or object is detected in the local path, thus avoiding a collision. The safety function layer 1008 may include specific neural network that is trained to override or modify a motion task.

In some embodiments, information is passed directly from motion planning layer 1006 to the operable elements of an autonomous vehicle without first passing through safety function layer.

In example embodiments, each layer 1002, 1004, 1006 can comprise software comprising computer-readable instructions, which when executed, provide instructions to control vehicle subsystems, and control operable elements of the vehicle, for example.

In at least some embodiments, system 1000 may be taken offline and each of the respective neural networks of the mission planning layer 1002, the behavior planning layer 1004, the motion planning layer 1006, and the safety planning layer 1008 can be further trained with new training data. System 1000 may then be stored on memory 1126 of vehicle control system 1115 and each neural network may be executed by processor 1102 to control vehicle 1105 during autonomous or semi-autonomous operation of the vehicle including in parallel with one or more of the other neural networks.

Figure 7:
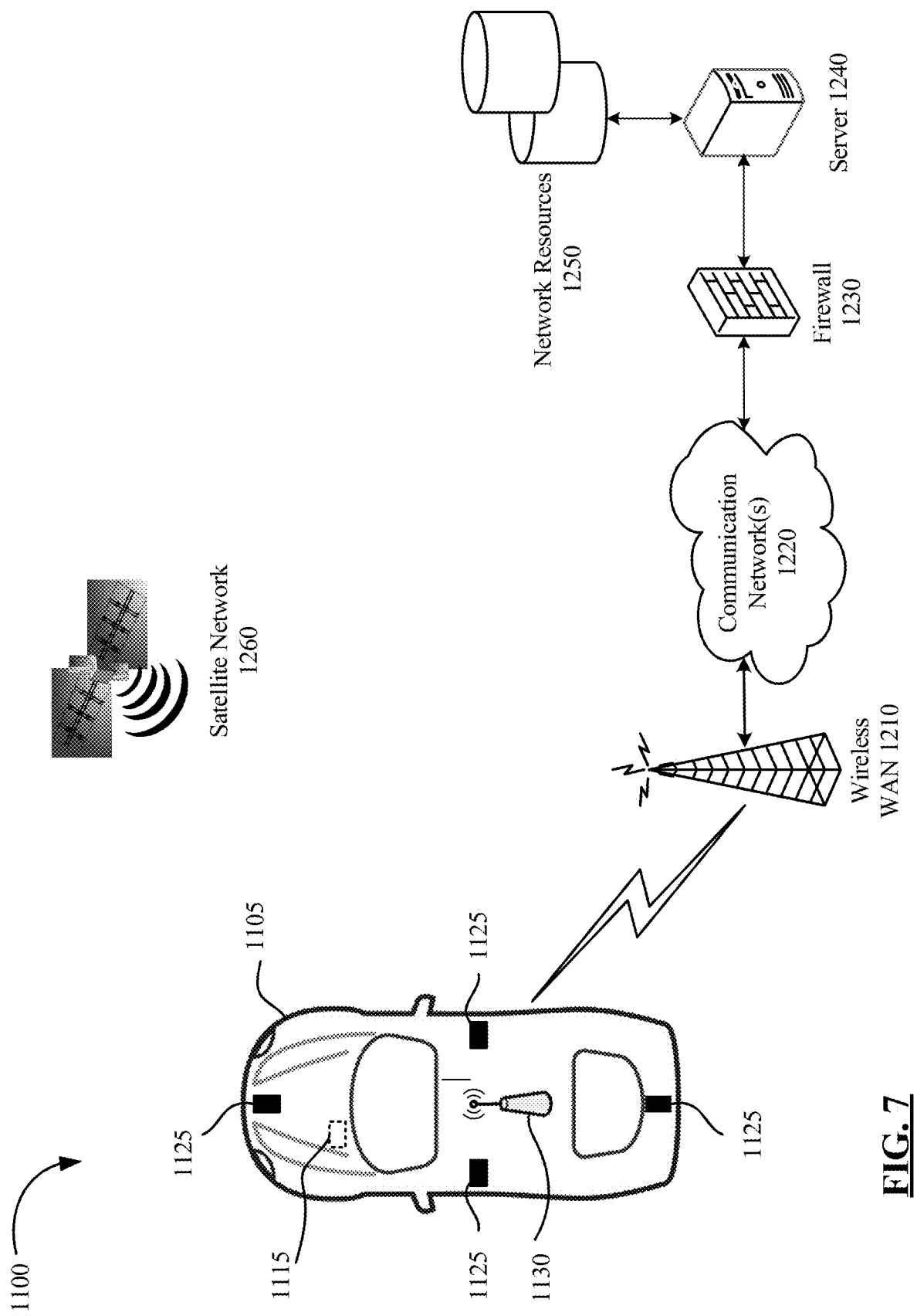
FIG. 7 is a schematic diagram of an autonomous vehicle operating in an environment that includes the control system of FIG. 6, in accordance with an example embodiment.
Figure 8:
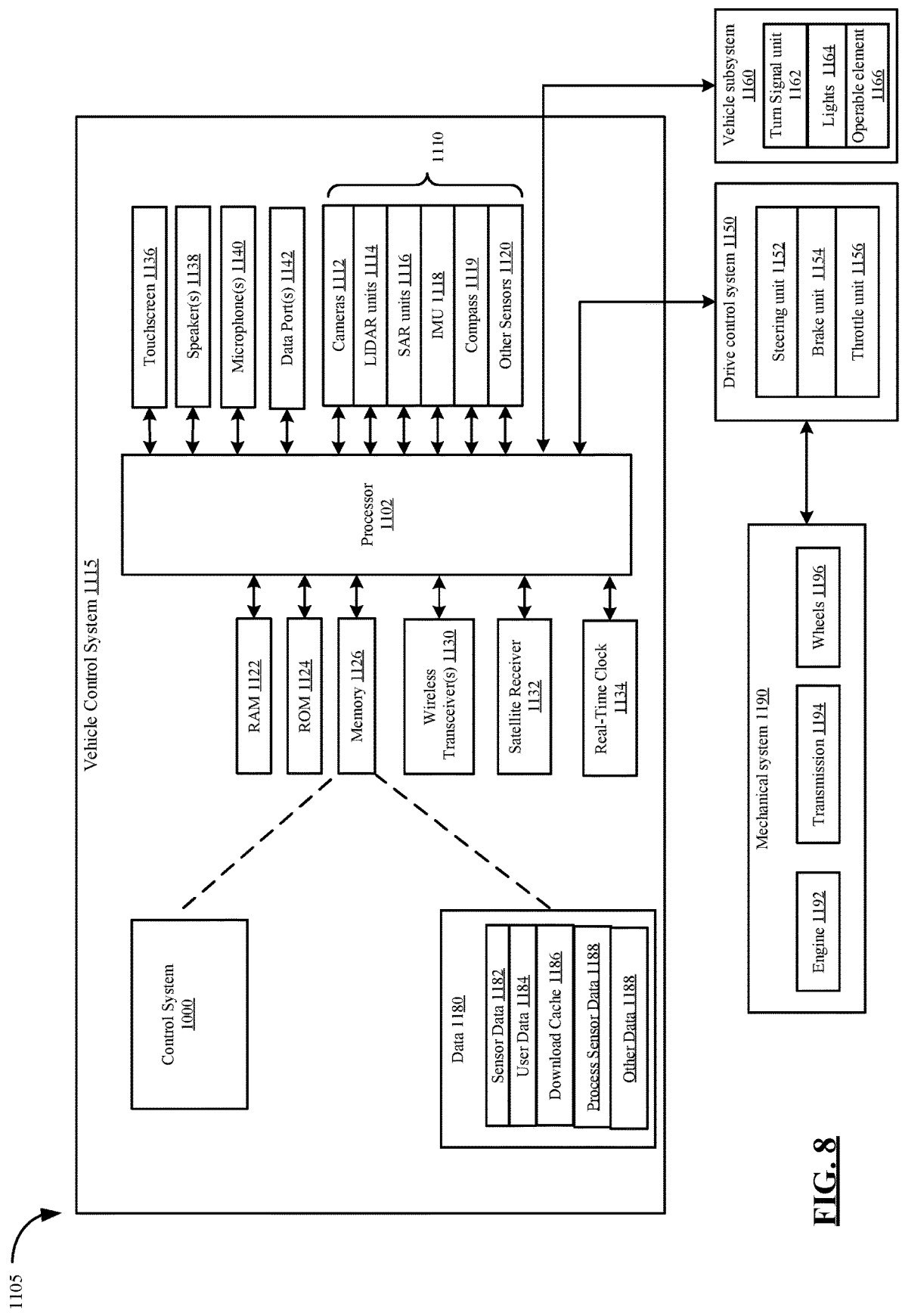
FIG. 8 is a block diagram of the vehicle of FIG. 7.

Referring now to FIG. 7 a schematic diagram of an environment 1100 in which a vehicle 1105 comprising the control system 1000 is operating in accordance with an example embodiment is shown. The vehicle 1105 comprises a vehicle control system HIS. The control system 1000 is implemented within the vehicle control system 1115 as shown in FIG. 8.

The vehicle control system 1115 comprises a plurality of sensors 1110 located about the vehicle 1105 and one or more wireless transceivers 1130 each coupled to a controller, such as a processor 1102 (FIG. 8), of the vehicle control system 1115. The plurality of sensors 1110 comprise one or more digital cameras 1112, one or more LIDAR units 1114, one or more radar units, such as one or more synthetic aperture radar (SAR) units 1116, an inertial measurement unit (IMU) 1118, an electronic compass 1119 and possibly other sensors 1120. The sensors 1110, when active, repeatedly (e.g., in regular intervals) sense information and provide the sensed information to the vehicle control system HIS in real-time or near real-time.

The cameras 1112 may capture static images or videos comprising a series of consecutive frames. The cameras 1112 may be two-dimensional (2D) cameras or stereoscopic or three-dimensional (3D) cameras that may sense depth and the three-dimensional structure of the environment surrounding the vehicle 1105. The cameras 1112 may capture visible light, infrared or both. The IMU 1118 senses the vehicle's specific force and angular rate using a combination of accelerometers and gyroscopes. The sensors 1110 may be used to sense the three-dimensional structure of the environment surrounding the vehicle 1105.

The vehicle control system 1115 collects information using the sensors 1110 about a local environment 1100 of the vehicle 1105 (e.g., any immediately surrounding obstacles) as well as information from a wider vicinity (e.g., the LIDAR units 1114 and SAR units 1116 may collect information from an area of up to 100 m radius around the vehicle 1105). The vehicle control system 1115 may also collect information about a position and orientation of the vehicle 1105 using the sensors 1110 such as the IMU 1118. The vehicle control system 1115 may determine a linear speed (e.g. odometer), angular speed, acceleration and tire grip of the vehicle 1105, among other factors, using the IMU 1118 and possibly other sensors 1120.

In the shown embodiment, there are four sensor units 1125 located at the front, rear, left side and right side of the vehicle 1105, respectively. The number and location of the sensor units 1125 may be different in other embodiments. For example, in some other embodiments the sensor units 125 are located in a housing, such as fixed or rotating carousel, that is mounted or otherwise located on the top (e.g., roof) of the vehicle 1105. The sensor units 1125 are located at the front, rear, left side and right side of the housing (and consequently the vehicle 1105), respectively, to scan the environment in front, rear, left side and right side of the vehicle 1105. In the described embodiments, the sensor units 1125 are oriented in four different directions to scan the environment in the front, rear, left side and right side of the vehicle 1105.

The sensor units 1125 comprise one or any combination of the sensors 1110 including cameras 1112, LIDAR units 1114, and SAR units 1116. The sensor units 1125 are mounted or otherwise located to have different fields of view (FOVs) between adjacent sensor units 1125 to capture the environment surrounding the vehicle 1105. The different FOVs may be overlapping.

The wireless transceivers 1130 enable the vehicle control system 1115 to exchange data and optionally voice communications with a wireless wide area network (WAN) 1210 disposed in the environment 1000 in which the vehicle 1105 operates. The vehicle control system 1115 may use the wireless WAN 1210 to access the server 1240, such as a driving assist server, via one or more communications networks 1220, such as the Internet. The server 1240 may be implemented as one or more server modules and is typically located behind a firewall 1230. The server 1240 is connected to network resources 1250, such as supplemental data sources that may be used by the vehicle control system 1115, for example, by one or more of the neural networks 1010, 1012, 1014, 1016.

The environment 1100 in which the vehicle operates comprises a satellite network 1260 comprising a plurality of satellites in addition to the WAN 1210. The vehicle control system 1115 comprises a satellite receiver 1132 (FIG. 8) that may use signals received by the satellite receiver 1132 from the plurality of satellites in a satellite network 1260 to determine its position. The satellite network 1260 typically comprises a plurality of satellites which are part of at least one Global Navigation Satellite System (GNSS) that provides autonomous geo-spatial positioning with global coverage. For example, the satellite network 1260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Reference is next made to FIG. 8, which illustrates selected components of a vehicle 1105 in accordance with another example embodiment. As noted above, the vehicle 1105 comprises a vehicle control system 1115 that is connected to a drive control system 1150, a vehicle subsystem 1160, and a mechanical system 1190. The vehicle 1105 also comprises various structural elements such as a frame, doors, panels, seats, windows, mirrors and the like that are known in the art but that have been omitted from the present example embodiment for clarity and to avoid obscuring the teachings herein. The processor 1102 is coupled to a plurality of components via a communication bus (not shown) which provides a communication path between the components and the processor 1102. The processor 1102 is coupled to a drive control system 1150, Random Access Memory (RAM) 1122, Read Only Memory (ROM) 1124, persistent (non-volatile) memory 1126 such as flash erasable programmable read only memory (EPROM) (flash memory), one or more wireless transceivers 1130 for exchanging radio frequency signals with a wireless network 1210, a satellite receiver 1132 for receiving satellite signals from the satellite network 1260, a real-time clock 1134, and a touchscreen 1136. Processor 1102 may include one or more digital processing units configured to perform the tasks described herein, including accessing memory and executing computer instructions stored on the memory to implement control system 1000. Processor 1102 may include one or more graphical processing units (GPUs) for higher level data processing or any number of processors known in the art.

Both vehicle subsystem 1160 and drive control system 1150 include one or more vehicle operable elements, which may be similar to vehicle operable elements 510 (FIG. 5). The vehicle operable elements of vehicle subsystem 1160 may include, turn signal unit 1162, a unit 1164 for controlling lights and other operable elements 1166 which correspond to other vehicle operable elements of the vehicle 1105.

The one or more wireless transceivers 1130 may comprise one or more cellular (RF) transceivers for communicating with a plurality of different radio access networks (e.g., cellular networks) using different wireless data communication protocols and standards. The vehicle control system 1115 may communicate with any one of a plurality of fixed transceiver base stations of the wireless WAN 1210 (e.g., cellular network) within its geographic coverage area. The one or more wireless transceiver(s) 1130 may send and receive signals over the wireless WAN 1210. The one or more wireless transceivers 1130 may comprise a multi-band cellular transceiver that supports multiple radio frequency bands.

The one or more wireless transceivers 1130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 1130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The real-time clock 1134 may comprise a crystal oscillator that provides accurate real-time information, such as those provided by Atmel Corporation.

The touchscreen 1136 comprises a display such as a color liquid crystal display (LCD), light-emitting diode (LED) display or active-matrix organic light-emitting diode (AMO-LED) display, with a touch-sensitive input surface or overlay connected to an electronic controller. Additional input devices (not shown) coupled to the processor 1102 may also be provided including buttons, switches and dials.

The vehicle control system 1115 also includes one or more speakers 1138, one or more microphones 1140 and one or more data ports 1142 such as serial data ports (e.g., Universal Serial Bus (USB) data ports). The vehicle control system 1115 may also include other sensors 1120 such as tire pressure sensors (TPSs), door contact switches, light sensors, proximity sensors, etc.

The drive control system 1150 serves to control movement of the vehicle 1105. The drive control system 1150 comprises a steering unit 1152, a brake unit 1154 and a throttle (or acceleration) unit 1156, each of which may be implemented as software modules or control blocks within the drive control system 1150. The steering unit 1152, brake unit 1154 and throttle unit 1156 process, when in fully or semi-autonomous driving mode, received information from control system 1000 stored in the memory 1126 of the vehicle control system 1115 and generate control signals to control the steering, braking and throttle of the vehicle 1105, respectively to drive a planned path as described in further detail below. The drive control system 1150 may include additional components to control other aspects of the vehicle 1105 including, for example, control of turn signals and brake lights.

The mechanical system 1190 receives control signals from the drive control system 1150 to operate the mechanical components of the vehicle 1105. The mechanical system 1190 effects physical operation of the vehicle 1105. The mechanical system 1190 comprises an engine 1192, a transmission 1194 and wheels 1196. The engine 1192 may be a gasoline-powered engine, a battery-powered engine, or a hybrid engine, for example. Other components may be included in the mechanical system 1190, including, for example, turn signals, brake lights, fans and windows, or may be included in vehicle subsystem 1160.

A graphical user interface (GUI) of the vehicle control system 1115 is rendered and displayed on the touchscreen 1136 by the processor 1102. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus. In at least some embodiments, the endpoint of the vehicle determined by mission planning layer 1002 or one or more mission tasks may be inputted using an input/output device connected to vehicle 1105 which may be one or more of the GUI, microphone 1140, touchscreen 1136 or another input device coupled to data ports 1142 and configured to provide instructions to vehicle 1105. These instructions may be stored in memory such as for example, memory 1126 and may be executed by processor 1102 to implement one or more of the mission tasks.

The memory 1126 of the vehicle control system 115 has stored thereon planning system software 1000 that is executed by the processor 1102. The planning system software 1000, when executed by the processor 1102, causes the navigation and control of the vehicle 1105 to be performed as described herein.

Figure 9:
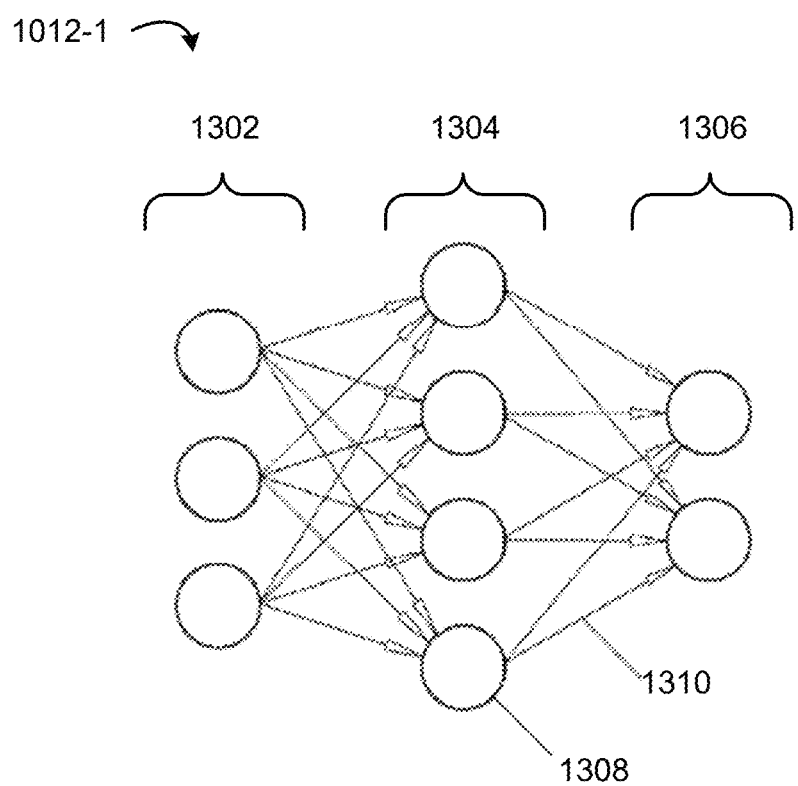
FIG. 9 is a schematic diagram illustrating an example relationship between nodes in a neural network of the control system of FIG. 6, in accordance with an example embodiment.

The memory 1126 also stores a variety of data 1180. The data 1180 may comprise sensor data 1182 sensed by the sensors 1110, user data 1184 comprising user preferences, settings and optionally personal media files (e.g., music, videos, directions, etc.), and a download cache 1186 comprising data downloaded via the wireless transceivers 1130. Data 1180 may also include processed sensor data 1186 and other data 1188 that has been obtained via one of feed forward or feedback from neural networks of the same or different planning layers. The sensor data 1182 may comprise image data 1190 (FIG. 10) from the cameras 1112, LIDAR data 1192 (FIG. 10) from the LIDAR units 1114, RADAR data 1194 (FIG. 10) from the SAR units 1116, IMU data 1196 from the IMU 1118, and possibly other sensor data 1198 from other sensors 1120 such as the compass 1119. The download cache 1186 may be deleted periodically, for example, after a predetermined amount of time. System software, software modules, specific device applications, or parts thereof, may be temporarily loaded into a volatile store, such as RAM 1122, which is used for storing runtime data variables and other types of data or information. Data 1180 received by the vehicle control system 1115 may also be stored in the RAM 1122. Although specific functions are described for various types of memory, this is merely one example, and a different assignment of functions to types of memory may also be used Referring now to FIGS. 9 and 10 which illustrate a representative neural network 1012-1 (associated with behaviour planning layer 1004) in accordance with an embodiment of the present disclosure. The structure and operation of neural network 1012-1 described below is identical to the structure and operation of all other neural networks in system 1000 including in neural network 1010-1 (associated with mission planning layer 1002), neural network 1014-1 (associated with motion planning layer 1006) and neural network 1016-1 (associated with safety planning layer 1008). The neural network 1012-1 may comprise a plurality of layers, some of which are defined and some of which are undefined (or hidden). The neural network 1012-1 may be one or more of a supervised learning neural network, unsupervised learning neural network or a reinforcement learning neural network.

In some example embodiments, the neural network 1012-1 may comprise a neural network input layer 1302, one or more of a plurality of neural network middle hidden layers 1304, and a neural network output layer 1306. The neural network output layer 1306 provides output data for the functional task that associated with the neural network 1012-1. Each of the neural network layers 1302, 1304, 1306 comprise a plurality of nodes 1308 (or neurons). The nodes 1308 of the neural network layers 1302, 1304, 1306 are connected, typically in series. The output of each node 1308 in a given neural network layer is connected to the output of one or more nodes 1308 in a subsequent neural network layer, as indicated by connections 1310. Each node 1308 is a logical programming unit that performs an activation function (also known as a transfer function) for transforming or manipulating data based on its inputs, a weight (if any) and bias factor(s) (if any) to generate an output. The activation function of each node 1308 results in a particular output in response to particular input(s), weight(s) and bias factor(s). The inputs of each node 1308 may be scalar, vectors, matrices, objects, data structures and/or other items or references thereto. Each node 1308 may store its respective activation function, weight (if any) and bias factors (if any) independent of other nodes 1308. In some example embodiments, the decision of one or more output nodes of the neural network output layer 1306 can be calculated or determined using a scoring function and/or decision tree function, using the previously determined weight and bias factors, as is understood in the art. The nodes 1308 of each of the neural network input layers 1302, 1304, 1306 may operate independently of the other nodes, allowing for parallel computing. The neural network 1012-1 can be trained by the training dataset. The neural network 1012-1 can also be trained by use of the vehicle (and inputs/outcomes measured therefrom, and/or any related data) and/or from use by other vehicles, and/or any other training methods known in the art.

Figure 10:
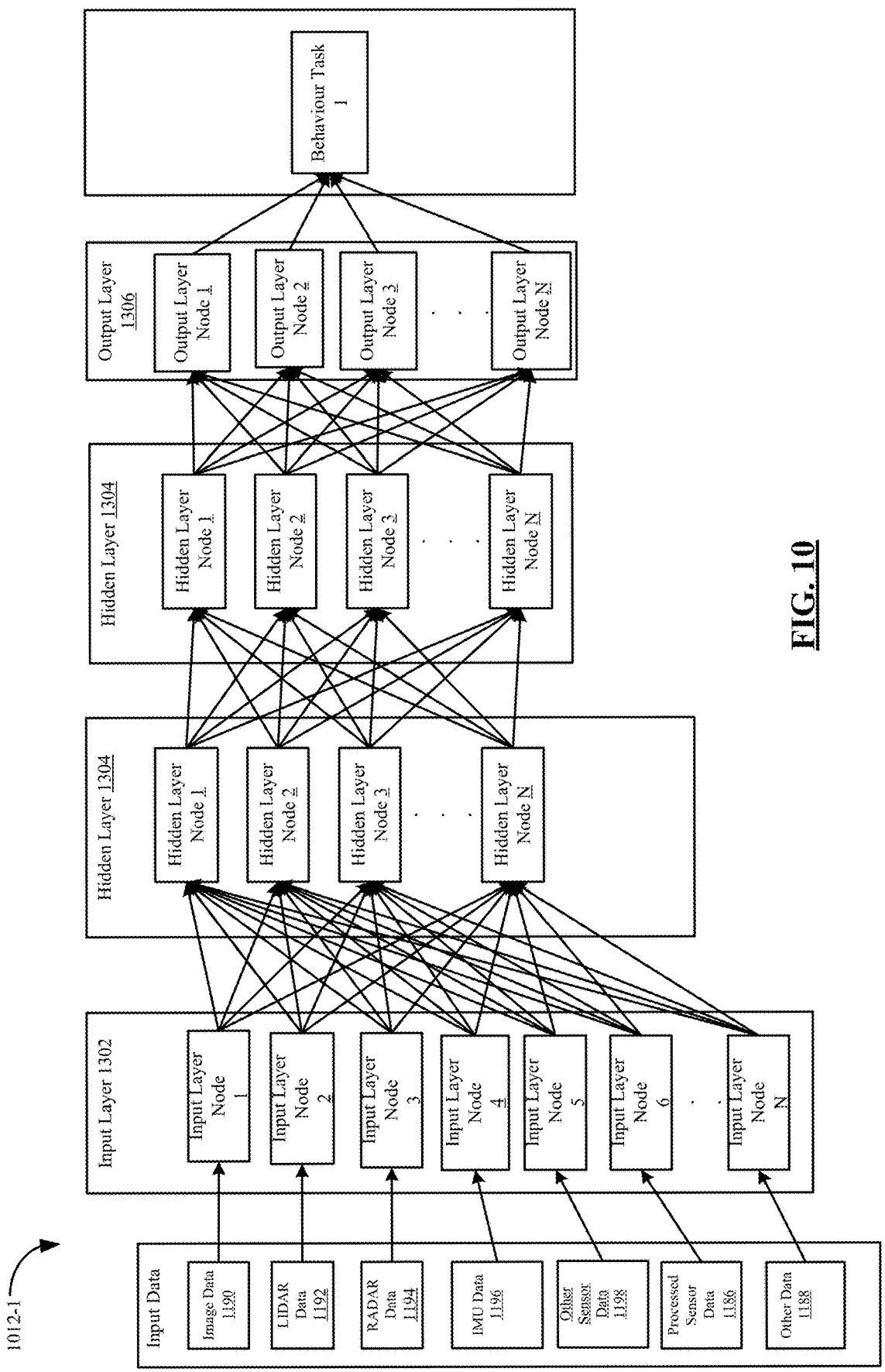
FIG. 10 is a schematic diagram of an example configuration of a neural network of the control system of FIG. 6 implemented in the vehicle of FIG. 7, in accordance with an example embodiment.

Referring to FIG. 10, the nodes 1308 of the neural network input layer 1302 may be configured to obtain the sensor data 1180 including one or more of RADAR data 1194, LIDAR data 1192, and image data 1190, from RADAR unit 1114, LIDAR units 1114, and camera unit 1112, respectively. The processed sensor data 1186 and the other data 1180 may be obtained from memory 1126. The image data 1190, the LIDAR data 1192, the RADAR data 1194, the IMU data 1196, and the other sensor data 1198 may also be stored in memory 1126 or another memory for use by neural network 1012-1 and may also be received directly by the neural network 1012-1.

In the shown embodiment, each of the processed sensor data 1186, the other data 1180, the image data 1190, the LIDAR data 1192, the RADAR data 1194, the IMU data 1196, and the other sensor data 1198 is received by a respective node in input layer 1302.

In operation, a weight may be set for each of the nodes 1308 of the neural network input layer 1302 and subsequent nodes of the neural network middle hidden layers 1304 and the neural network output layer 1306 of the neural network 1012-1. A weight is a numerical value, usually between 0 and 1, that indicates the connection strength between a node in one layer and a node in a subsequent layer. An offset (or bias) may also be set for each of the inputs of the neural network input layer 1302 and subsequent nodes of the neural network middle hidden layers 1304 and the neural network output layer 1306 of the neural network 1012-1.

A scalar product of the input of each of the neural network input layer 1302, its respective weight and bias factor (if any) are determined and output to a respective node of the neural network middle hidden layers 1304 which receives the scalar product as input. Each of the scalar products are concatenated into another vector, and another scalar product of the input of a first neural network middle hidden layer 1304 and its respective weight and bias factor (if any) is determined and output to a node of a second neural network middle hidden layer 1304 which receives the scalar product as input. This process is repeated in sequence through each of the plurality of neural network middle hidden layers 1304 up to the neural network output layer 1306 having one or more outputs (output nodes) corresponding to the functional task (e.g. mission task 1) associated with the neural network 1012-1. The finally decided one or more outputs of the neural network output layer 1304 can be calculated or determined using the activation function, and/or a scoring function and/or a decision tree function, using the previously determined weight and bias factors, as is understood in the art.

Each functional task of each neural network may output data corresponding to an instruction or command for controlling at least one operable element (such as operable element 510) of the vehicle 1105. For example, a functional task (e.g. the mission planning task 1) associated with the mission planning layer 1002 may be associated with executing a command to generate a navigation plan for the vehicle 1105. Output data provided by the neural network 1010-1 may be provided to one or more vehicle operable elements of the vehicle, such as GPS unit and/or IMU unit.

A functional task (e.g. a behavior planning) associated with behavior planning neural network 1012-1 may be associated with the vehicle 1105 changing lanes. Output data provided by the neural network 1012-1 may be provided to one or more vehicle operable elements of the vehicle subsystem 1160, such as turn signal control 1162, and to one or more operable elements of the drive control system 1150, such as the steering unit 1152. A functional task associated with the neural network 1014-1 of the motion planning layer 1006 may be rapid acceleration to complete a merge. This functional task may be implemented by one or more vehicle operable elements such as a throttle unit 1156. In some embodiments, each respective neural network may be generate output data associated with a respective functional task to control at least one of the vehicle operable elements.

Referring again to FIG. 10, the number of neural network middle layers 1304, the number of nodes 1308 in each of the neural network layers 1302, 1304, and 1306, and the connections between the nodes 1308 of each neural network layer 1302, 1304, and 1306 may vary between embodiments based on processing power, efficiency of performance, the input(s) (e.g., sensor data) and output(s) for the functional task (e.g. mission task 1) associated with the neural network 1012-1 for the system 1000.

The weight and bias factor (if any) of each node 1308, and in some example embodiments the activation function of the nodes 1308 of the neural network 1012-1, are determined for optimal performance of an autonomous operation, such as parking or driving, through at least one of a reinforcement learning process, a supervised learning process or an unsupervised learning process. A scoring function and/or a decision tree function can be used to determine the optimally one or more outputs of the neural network 1012-1.

The nodes 1308 of the neural network input layer 1302 do not have activation functions in some example embodiments. The nodes 1308 of the neural network input layer 1302 are typically placeholders into which the input data is weighted and summed. The neural network middle hidden layers 1304 encode the data 1186, 1188, 1190, 1192, 1194, 1196, 1198.

As applicable, in some example embodiments, at least some of the described embodiments may similarly apply to mobile robots and/or semi-autonomous vehicles.

The planning software system of the present disclosure enables an autonomous vehicle or mobile robot to operate in an environment while accounting for different scenarios that the mobile robot or the autonomous vehicle may experience. Furthermore, the planning software system of the present disclosure is computationally intensive less intensive than prior art software systems due to the implementation of different neural networks associated with distinct functional tasks for controlling operable elements of an autonomous vehicle or mobile robot.

In the described methods or block diagrams, the boxes may represent events, steps, functions, processes, modules, messages, and/or state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A planning system for vehicle, the planning system comprising:
    a plurality of hierarchal software layers including:
        a mission planning layer comprising one or more neural networks configured to determine an optimal route for the vehicle or mobile robot based on a start point, an end point and a digital map of an environment surrounding the vehicle;
        a behaviour planning layer comprising one or more neural networks, the behaviour planning layer configured to receive the optimal route determined by the mission planning layer and sensor data sensed by a plurality of sensors of the vehicle, each neural network of the behaviour planning layer configured to predict a respective behavior task for the vehicle based on the sensor data and the optimal route; and
        a motion planning layer comprising one or more neural networks, the motion planning layer configured to receive each behaviour task predicted by the behaviour planning layer and the sensor data, each neural network of the motion planning layer configured to predict a respective motion task for the vehicle based on the received behavior tasks and the sensor data, wherein the behaviour planning layer is feed-associated with the motion planning layer, and wherein the behaviour planning layer is configured to feed-forward information to the motion planning layer and receive feedback of information from the motion planning layer.

2. The planning system of claim 1, wherein the mission planning layer is feed-associated with the behaviour planning layer, and wherein the mission planning layer is configured to receive feedback of at least one of information, control, and metadata from the behaviour planning layer.

3. The planning system of claim 1, wherein each neural network of the behaviour planning layer is feed-associated with each neural network of the a-hierarchically adjacent motion planning layer.

4. The planning system of claim 1 wherein the mission planning task comprises one or more neural networks configured to determining one or more checkpoints along the optimal route, and calculating any associated tolls along the optimal route.

5. The planning system of claim 1 wherein the respective behavior task is associated with a respective behavior of the autonomous vehicle.

6. The planning system of claim 5 wherein each respective behavior task comprises one of: changing a lane, waiting at an intersection, passing another vehicle or mobile robot, giving way to the another vehicle or mobile robot, or waiting at an intersection.

7. The planning system of claim 1 wherein each respective motion task comprising one of avoiding an obstacle, finding a local path, or controlling the speed, direction or position of the vehicle or the mobile robot.

8. The planning system of claim 7 wherein the respective motion task is performed by controlling at least one operable element of the vehicle, wherein the at least one operable element includes a GPS unit, steering unit, a brake unit, or a throttle unit.

9. The planning system of claim 1 wherein the sensor data comprises one or more of image data, LIDAR data, RADAR data, global positioning system (GPS) data, and inertial measurement unit (IMU) data, and processed sensor data.

10. The system of claim 1 wherein the sensor data includes data sensed by one or more of a camera, a LIDAR system, a RADAR system, a global position system, and an inertial measurement unit of the vehicle.

11. The planning system of claim 1 wherein each of the one or more neural networks of each of the mission planning layer, the behaviour planning layer, and the motion planning layer are trained offline with new training data before autonomous operation of the vehicle or mobile robot.

12. The planning system of claim 1 wherein the vehicle comprises a mobile robot, an autonomous vehicle, an autonomous robot, or autonomous drone.

13. The planning system of claim 1, wherein the plurality of hierarchical software layers further comprise a safety planning layer comprising one or more neural networks, each of the one or more neural networks of the safety planning a respective safety task, the respective safety task comprising determining whether a motion planning task corresponding to the respective safety task is safe.

14. The planning system of claim 1, wherein the mission planning layer is hierarchically adjacent to the behaviour planning layer and the behaviour planning layer is hierarchically adjacent to the motion planning layer.

15. The planning system of claim 1, wherein the one or more neural networks of the mission planning layer are configured to determine the optimal route for the vehicle based on one or more of driving rules, a distance from the start point to the end point and a determination of a shortest distance from the start point to the end point, and a shortest time to travel from the start point to the end point giving the presence of any fixed obstacles between the vehicle and the end point.

16. A method of controlling autonomous operation of a vehicle or mobile robot, the method comprising:
receiving a plurality of behaviour tasks predicted by a behaviour planning layer of a planning system of the vehicle or mobile, each respective behaviour task predicted by a respective neural network of a plurality of neural networks of the behaviour planning layer based on an optimal route determined by a mission planning layer of the planning system and a sensor data received from a sensor mounted to the vehicle or mobile robot;
receiving a plurality of motion tasks from a mission planning layer of a planning system of the vehicle or robot, each respective motion task predicted by a respective neural network of a plurality of neural networks of the motion planning layer based on the behaviour tasks received from the behaviour planning layer and the sensor data, wherein the behaviour planning layer is feed-associated with the motion planning layer, and wherein the behaviour planning layer is configured to feed-forward information to the motion planning layer and receive feedback of information from the motion planning layer; and
controlling the vehicle or mobile robot based on the predicted behaviour tasks and the predicted motion tasks to operate the vehicle or mobile robot autonomously to navigate the optimal route.

17. A computer program product comprising instructions which, when the program is executed by a computer cause the computer to carry out the method of claim 16.

18. The method of claim 16, wherein controlling comprises controlling one or more operable elements of the vehicle or mobile robot to cause the vehicle or mobile robot to perform each behaviour task and each motion task to operate the vehicle or mobile robot autonomously to navigate the optimal route.

19. A non-transitory computer readable medium storing instructions executable by at least one processor of a vehicle to cause the vehicle to perform the method of claim 16.

* * * * *

UNITED STATES PATENT AND TRADEMARK OFFICE
CERTIFICATE OF CORRECTION

| | |
|---|---|
| PATENT NO. | : 10,796,204 B2 |
| APPLICATION NO. | : 15/905705 |
| DATED | : October 6, 2020 |
| INVENTOR(S) | : Mohsen Rohani, Jun Luo and Song Zhang |

It is certified that error appears in the above-identified patent and that said Letters Patent is hereby corrected as shown below:

In the Claims

In Column 24, Line 64 (Claim 3): "with each neural network of the a-hierarchially adjacent" should read --with each neural network of the hierarchially adjacent--.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*